(12) United States Patent
Matsuda et al.

(10) Patent No.: US 8,797,569 B2
(45) Date of Patent: Aug. 5, 2014

(54) PRINTING DEVICE, CONTENTS-PROVIDING SYSTEM, AND COMPUTER PROGRAM

(75) Inventors: Makoto Matsuda, North Brunswick, NJ (US); Kiyotaka Ohara, Aichi (JP); Kazuma Aoki, Aichi (JP); Satoshi Watanabe, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1512 days.

(21) Appl. No.: 11/513,238

(22) Filed: Aug. 31, 2006

(65) Prior Publication Data

US 2007/0046992 A1 Mar. 1, 2007

(30) Foreign Application Priority Data

Aug. 31, 2005 (JP) .................................. 2005-251782

(51) Int. Cl.
 G06F 3/12 (2006.01)
(52) U.S. Cl.
 USPC ........ 358/1.15; 358/471; 358/1.18; 358/1.13; 705/80; 709/202; 709/219
(58) Field of Classification Search
 USPC .................. 358/1.15, 403; 705/14, 7; 400/76; 700/91
 See application file for complete search history.

(56) References Cited

U.S. PATENT DOCUMENTS

| | | | |
|---|---|---|---|
| 5,978,477 A * | 11/1999 | Hull et al. | 358/403 |
| 6,882,439 B2 * | 4/2005 | Ishijima | 358/1.15 |
| 6,891,636 B1 * | 5/2005 | Kawai et al. | 358/1.18 |
| 7,011,462 B2 * | 3/2006 | Hanaoka | 400/76 |
| 7,106,471 B2 * | 9/2006 | Ohwa | 358/1.15 |
| 7,266,590 B2 | 9/2007 | Nakaoka | |
| 7,386,603 B2 | 6/2008 | Shiba et al. | |
| 7,647,299 B2 * | 1/2010 | Harik | 707/999.003 |
| 7,792,491 B2 * | 9/2010 | Whitten | 455/66.1 |
| 8,196,095 B2 * | 6/2012 | Gupta et al. | 717/109 |
| 8,395,803 B2 * | 3/2013 | Aoki et al. | 358/1.16 |

(Continued)

FOREIGN PATENT DOCUMENTS

| | | |
|---|---|---|
| CN | 1392496 A | 1/2003 |
| JP | 11-192760 A | 7/1999 |

(Continued)

OTHER PUBLICATIONS

Japanese Office Action, with English translation issued in Japanese Patent Application No. JP 2005-251782 dated May 27, 2008.

(Continued)

*Primary Examiner* — Ashish K Thomas
(74) *Attorney, Agent, or Firm* — Scully, Scott, Murphy & Presser, P.C.

(57) ABSTRACT

A printing device includes a receiving system configured to receive printing data including first information, second information and provider-specifying information that specifies a provider of the second information, from an external apparatus; a printing system configured to perform printing based on the printing data received by the receiving system; an obtaining system configured to obtain printing information representing a predetermined parameter regarding printing of the second information performed by the printing system; a storing system configured to store the printing information obtained by the obtaining system and the provider-specifying information corresponding to the printing information; and a sending system configured to send the printing information and the provider-specifying information stored by the storing system to an aggregating server.

11 Claims, 28 Drawing Sheets

(56) References Cited

U.S. PATENT DOCUMENTS

| | | | |
|---|---|---|---|
| 2001/0030773 A1* | 10/2001 | Matsuura et al. | 358/471 |
| 2002/0019757 A1* | 2/2002 | Dodt et al. | 705/7 |
| 2002/0191039 A1 | 12/2002 | Minowa et al. | |
| 2004/0034440 A1* | 2/2004 | Middlebrook | 700/91 |
| 2004/0177000 A1* | 9/2004 | Takamine | 705/14 |
| 2005/0225796 A1* | 10/2005 | Horihata | 358/1.15 |
| 2006/0288362 A1* | 12/2006 | Pulton et al. | 725/34 |
| 2008/0082904 A1* | 4/2008 | Martinez et al. | 715/205 |
| 2008/0140502 A1* | 6/2008 | Birnholz et al. | 705/10 |
| 2009/0012905 A1* | 1/2009 | Mawani et al. | 705/80 |
| 2009/0076914 A1* | 3/2009 | Coueignoux | 705/14 |

FOREIGN PATENT DOCUMENTS

| | | |
|---|---|---|
| JP | 2001-229246 | 8/2001 |
| JP | 2002055918 | 2/2002 |
| JP | 2002-083202 | 3/2002 |
| JP | 2002-132917 | 5/2002 |
| JP | 2002-149545 | 5/2002 |
| JP | 2002-297619 | 10/2002 |
| JP | 2003-16356 | 1/2003 |
| JP | 2003-178236 | 6/2003 |
| JP | 2003-216855 | 7/2003 |

OTHER PUBLICATIONS

Chinese Office Action, with English Translation, issued in corresponding Chinese Patent Application No. 2006101264568, dated on Aug. 17, 2007.

Japanese Office Action, with English Translation, issued in Japanese Patent Application No. JP 2005-251782 dated on Dec. 16, 2008.

Chinese Official Action dated Jul. 8, 2010 together with an English language translation.

* cited by examiner

FIG.2A

ADVERTISER TABLE — 34

| ADVERTISER ID | E-MAIL ADDRESS |
|---|---|
| KIDa | aaa@aaa.cojp |
| KIDb | bbb@bbb.cojp |
| ⋮ | ⋮ |

FIG.2B

AGGREGATE TABLE — 35

| ADVERTISER ID | CONSUMER ID | CONSUMABLE SUPPLY POINT | CONDITION ID | CONDITION FLAG |
|---|---|---|---|---|
| KIDa | CIDa | aaa point | JIDa | 1 |
| KIDb | CIDb | bbb point | JIDb | 0 |
| KIDc | CIDc | ccc point |  | 1 |
| ⋮ | ⋮ | ⋮ | ⋮ | ⋮ |

FIG.2C

COEFFICIENT TABLE — 36

| PAPER TYPE | COEFFICIENT |
|---|---|
| Pxxx | px |
| Pyyy | py |
| ⋮ | ⋮ |

FIG.3A

| ADVERTISER TABLE | | 45 |
|---|---|---|
| ADVERTISER ID | URL | |
| KIDa | http ://aaa.＊＊＊/＊＊＊ | |
| KIDb | http ://aaa.＊＊＊/＊＊＊ | |
| ⋮ | ⋮ | |

FIG.3B

```
<CONTENTS DATA>
  <TITLE>INFORMATION ON EVENT</TITLE>
  <PARTIAL DATA TYPE="ADVERTISEMENT" COORDINATE x="0cm" COORDINATE y="0cm" LATERAL WIDTH="10cm" LONGITUDINAL LENGTH="3cm" >
    <ADVERTISER ID>KID 1</ADVERTISER ID>
    <ADVERTISER URL>http://***/***/***</ADVERTISER URL>
    <CONDITION ID>JID 1</CONDITION ID>
    <PRINTING DATA TYPE="DATA" >
      (ADVERTISEMENT PRINTING DATA 1)
    </PRINTING DATA>
  </PARTIAL DATA>
  <PARTIAL DATA TYPE="ADVERTISEMENT" COORDINATE x="0cm" COORDINATE y="3cm" LATERAL WIDTH="18cm" LONGITUDINAL LENGTH="20cm" >
    <ADMINISTRATOR ID>AID 1</ADMINISTRATOR ID>
    <PRINTING DATA TYPE="DATA" >
      (GENERAL PRINTING DATA)
    </PRINTING DATA>
  </PARTIAL DATA>
  <PARTIAL DATA TYPE="ADVERTISEMENT" COORDINATE x="8cm" COORDINATE y="23cm" LATERAL WIDTH="10cm" LONGITUDINAL LENGTH="2cm" >
    <ADVERTISER ID>KID 2</ADVERTISER ID>
    <PRINTING DATA TYPE="URL" >
      http://***/***/***
    </PRINTING DATA>
  </PARTIAL DATA>
</CONTENTS DATA>
```

FIG.5A

FIRST AGGREGATE TABLE — 54

| ADVERTISER ID | CONSUMER ID | CONSUMABLE SUPPLY POINT | CONDITION ID | CONDITION FLAG |
|---|---|---|---|---|
| KIDa | CIDa | aaa point | JIDa | 1 |
| KIDb | CIDb | bbb point | JIDb | 0 |
| KIDc | CIDc | ccc point |  | 1 |
| ⋮ | ⋮ | ⋮ | ⋮ | ⋮ |

FIG.5B

SECOND AGGREGATE TABLE — 55

| ADVERTISER ID | CONSUMER ID | CONSUMABLE SUPPLY POINT | CONDITION ID | CONDITION FLAG |
|---|---|---|---|---|
| KIDa | CIDa | aaa point | JIDa | 1 |
| KIDb | CIDb | bbb point | JIDb | 0 |
| KIDc | CIDc | ccc point |  | 1 |
| ⋮ | ⋮ | ⋮ | ⋮ | ⋮ |

FIG.5C

COEFFICIENT TABLE — 56

| PAPER TYPE | COEFFICIENT |
|---|---|
| Pxxx | px |
| Pyyy | py |
| ⋮ | ⋮ |

FIG.15A

AGGREGATED DATA SAMPLE
(IN CASE OF ADVERTISER URL AND CONDITION ID BEING INCLUDED)

```
<AGGREGATED DATA>
    <PAGE NUMBER>x</PAGE NUMBER>
    <CONSUMER ID>CIDx</CONSUMER ID>
    <ADVERTISER ID>KID1</ADVERTISER ID>
    <ADVERTISER URL>http://***/***/***</ADVERTISER URL>
    <CONDITION ID>JID1</CONDITION ID>
    <PAPER TYPE>Pxxx</PAPER TYPE>
    <NUMBER OF PAGES>s1</NUMBER OF PAGES>
    <PRINTING TYPE>INK A </PRINTING TYPE>
</AGGREGATED DATA>
```

FIG.15B

AGGREGATED DATA SAMPLE
(IN CASE OF ADVERTISER URL AND CONDITION ID NOT BEING INCLUDED)

```
<AGGREGATED DATA>
    <PAGE NUMBER>x</PAGE NUMBER>
    <CONSUMER ID>CIDx</CONSUMER ID>
    <ADVERTISER ID>KID2</ADVERTISER ID>
    <PAPER TYPE>Pxxx</PAPER TYPE>
    <NUMBER OF PAGES>s2</NUMBER OF PAGES>
    <PRINTING TYPE>INK A </PRINTING TYPE>
</AGGREGATED DATA>
```

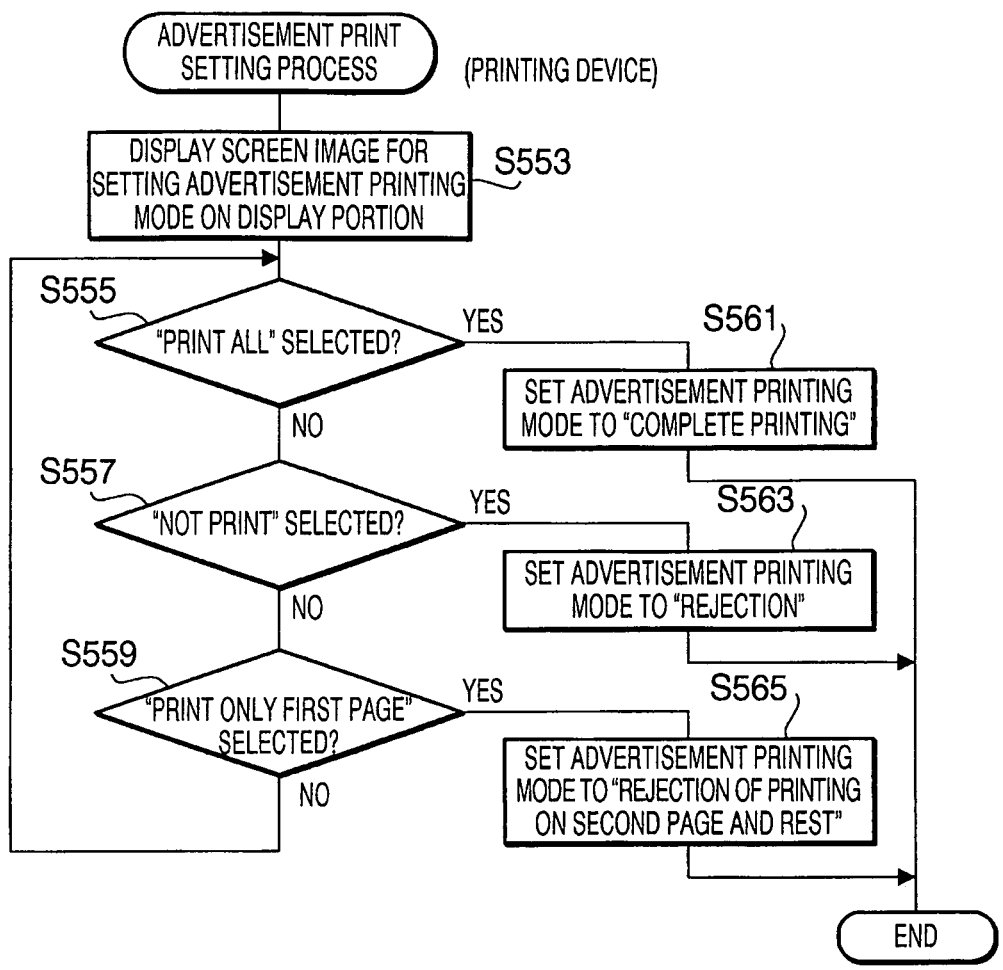
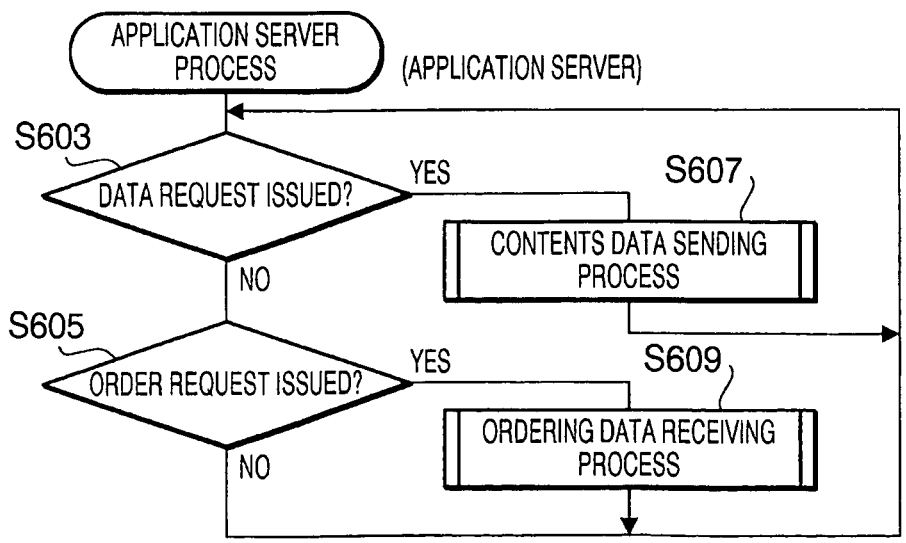

FIG.29A

COEFFICIENT TABLE                                           36a,56a

| COLOR / TYPE | C | M | Y | K |
|---|---|---|---|---|
| INK A | ca | ma | ya | ka |
| TONER B | cb | mb | yb | kb |
| ⋮ | ⋮ | ⋮ | ⋮ | ⋮ |

FIG.29B

AGGREGATED DATA SAMPLE

```
<AGGREGATED DATA>
    <PAGE NUMBER>x</PAGE NUMBER>
    <CONSUMER ID>CIDx</CONSUMER ID>
    <ADVERTISER ID>KID2</ADVERTISER ID>
    <PAPER TYPE>Pxxx</PAPER TYPE>
    <USED AMOUNT C>s2</USED AMOUNT C>
    <USED AMOUNT M>s2</USED AMOUNT M>
    <USED AMOUNT Y>s2</USED AMOUNT Y>
    <USED AMOUNT K>s2</USED AMOUNT K>
    <PRINTING TYPE>INK A </PRINTING TYPE>
</AGGREGATED DATA>
```

FIG.30A

AGGREGATED DATA SAMPLE
(IN CASE OF VALUES THAT ENABLE TO CALCULATE PRINTED AMOUNT BEING INCLUDED)

```
<AGGREGATED DATA>
    <PAGE NUMBER>x</PAGE NUMBER>
    <CONSUMER ID>CIDx</CONSUMER ID>
    <ADVERTISER ID>KID 1</ADVERTISER ID>
    <ADVERTISER URL>http://***/***/***</ADVERTISER URL>
    <CONDITION ID>JID1</CONDITION ID>
    <PAPER TYPE>Pxxx</PAPER TYPE>
    <PRINTING TYPE>INK A </PRINTING TYPE>
    <PRINTED AMOUNT INFORMATION>
        <COORDINATEx>0cm</COORDINATEx>
        <COORDINATEy>0cm</COORDINATEy>
        <LATERAL WIDTH>10cm</LATERAL WIDTH>
        <LONGITUDINAL LENGTH>3cm</LONGITUDINAL LENGTH>
    </PRINTED AMOUNT INFORMATION>
</AGGREGATED DATA>
```

FIG.30B

AGGREGATED DATA SAMPLE
(IN CASE OF VALUES THAT ENABLE TO CALCULATE PRINTED AMOUNT BEING INCLUDED)

```
<AGGREGATED DATA>
    <PAGE NUMBER>x</PAGE NUMBER>
    <CONSUMER ID>CIDx<CONSUMER ID>
    <ADVERTISER ID>CHD1</ADVERTISER ID>
    <PAPER TYPE>Pxxx</PAPER TYPE>
    <PRINTING TYPE>INK A </PRINTING TYPE>
    <PRINTED AMOUNT>
        <ADVERTISEMENT 1>
            <AREA>
                <VALUE>100</VALUE>
                <UNIT>cmxcm</UNIT>
            </AREA>
            <LOCATION>
                <COORDINATEx>8cm</COORDINATEx>
                <COORDINATEy>23cm</COORDINATEy>
            </LOCATION>
          <ADVERTISEMENT 1>
    </PRINTED AMOUNT>
</AGGREGATED DATA>
```

PRINTING DEVICE, CONTENTS-PROVIDING SYSTEM, AND COMPUTER PROGRAM

CROSS-REFERENCE TO RELATED APPLICATION

This application claims priority under 35 U.S.C. §119 from Japanese Patent Application No. 2005-251782, filed on Aug. 31, 2005. The entire subject matter of the application is incorporated herein by reference.

BACKGROUND

1. Technical Field

The following description relates to one or more techniques used for aggregating printing information, which represents a predetermined parameter regarding printing of specified information such as advertisement information, when the specified information is printed by a printing device.

2. Related Art

Recently, there is known such a technique that a printing device included in a device such as a Multi-Function Peripheral (MFP), printer, and facsimile machine connected to a network is utilized as an advertising medium. For example, in Japanese Patent Provisional Publication No. HEI 11-192760, there is disclosed a technique with which a service is provided to a user at a cheaper charge than usual when the user has selected an advertisement-including mode, i.e., a mode where an advertisement is printed together with intended information. It is noted that, for example, the intended information and advertisement may be defined as first information and second information, respectively.

SUMMARY

Aspects of the present invention are advantageous in that there can be provided one or more improved techniques for aggregating information related to printing of second information when a printing device can print the second information provided by an information provider as well as first information.

BRIEF DESCRIPTION OF THE ACCOMPANYING DRAWINGS

FIG. 1 is a block diagram illustrating a configuration of a contents-providing system in accordance with one or more aspects of the present invention.

FIGS. 2A, 2B, and 2C are illustrations of an advertiser table, aggregate table, and coefficient table provided in an aggregating server, respectively, in accordance with one or more aspects of the present invention.

FIG. 3A is an illustration of an advertiser table provided in an application server in accordance with one or more aspects of the present invention.

FIG. 3B is an illustration showing an example of a configuration of contents data with one or more aspects of the present invention.

FIGS. 5A, 5B, and 5C are illustrations of a first aggregate table, second aggregate table, and coefficient table provided in an advertiser server, respectively, in accordance with one or more aspects of the present invention.

Figure 6:
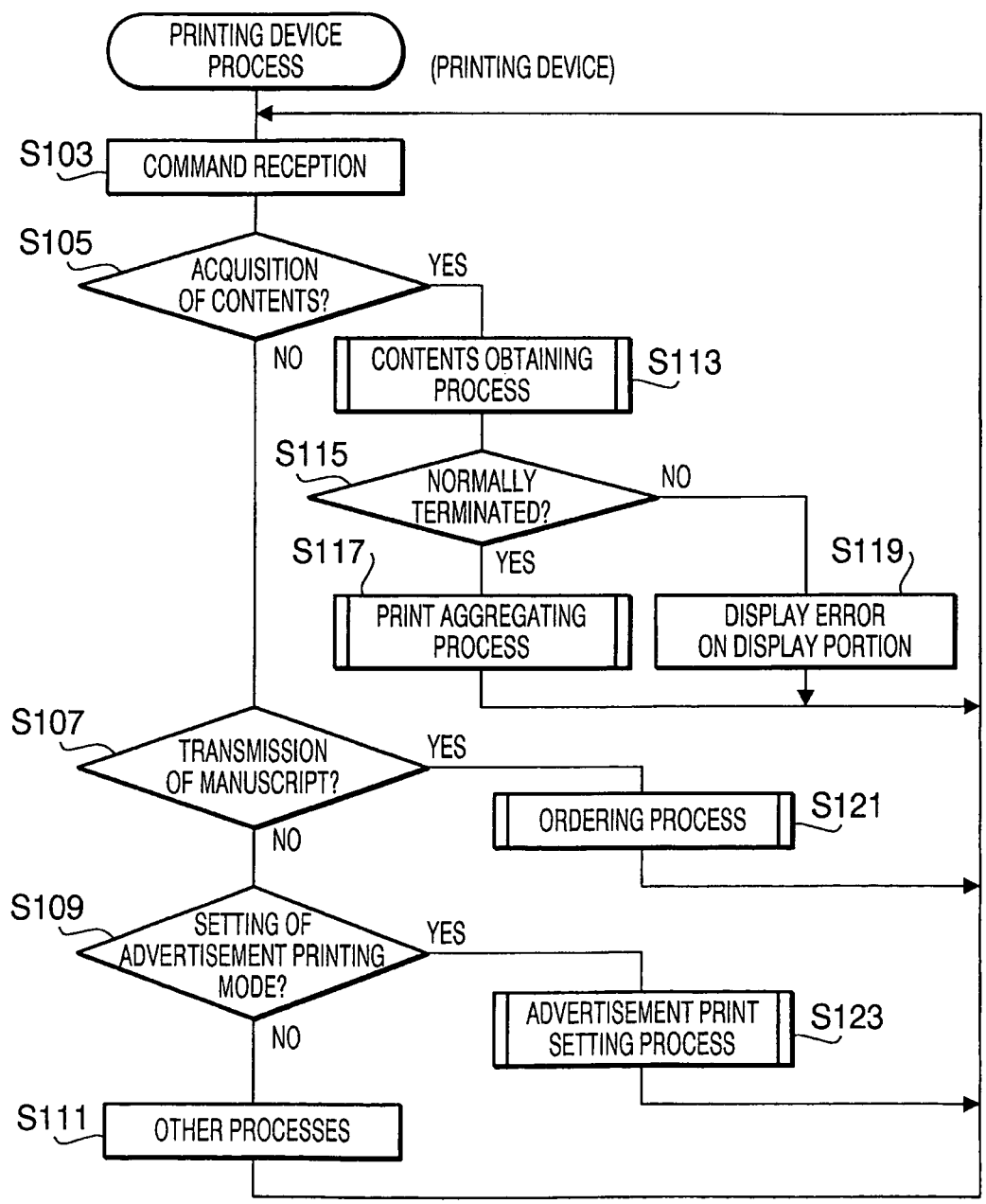

FIG. 6 is a flowchart showing a procedure of a printing device process in accordance with one or more aspects of the present invention.

Figure 7:
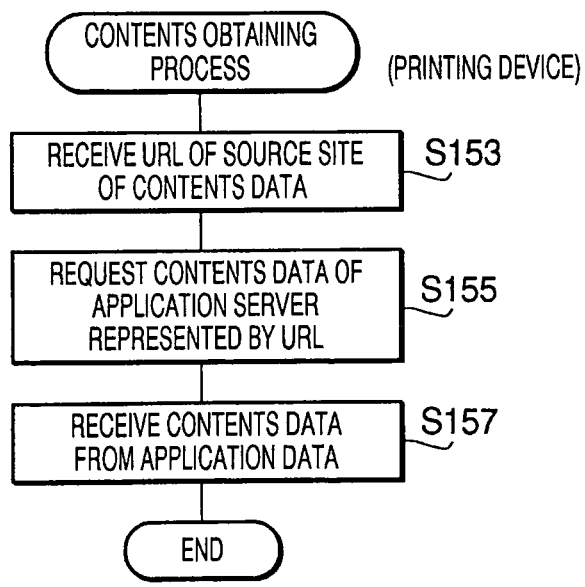

FIG. 7 is a flowchart showing a procedure of a contents obtaining process in accordance with one or more aspects of the present invention.

Figure 8:
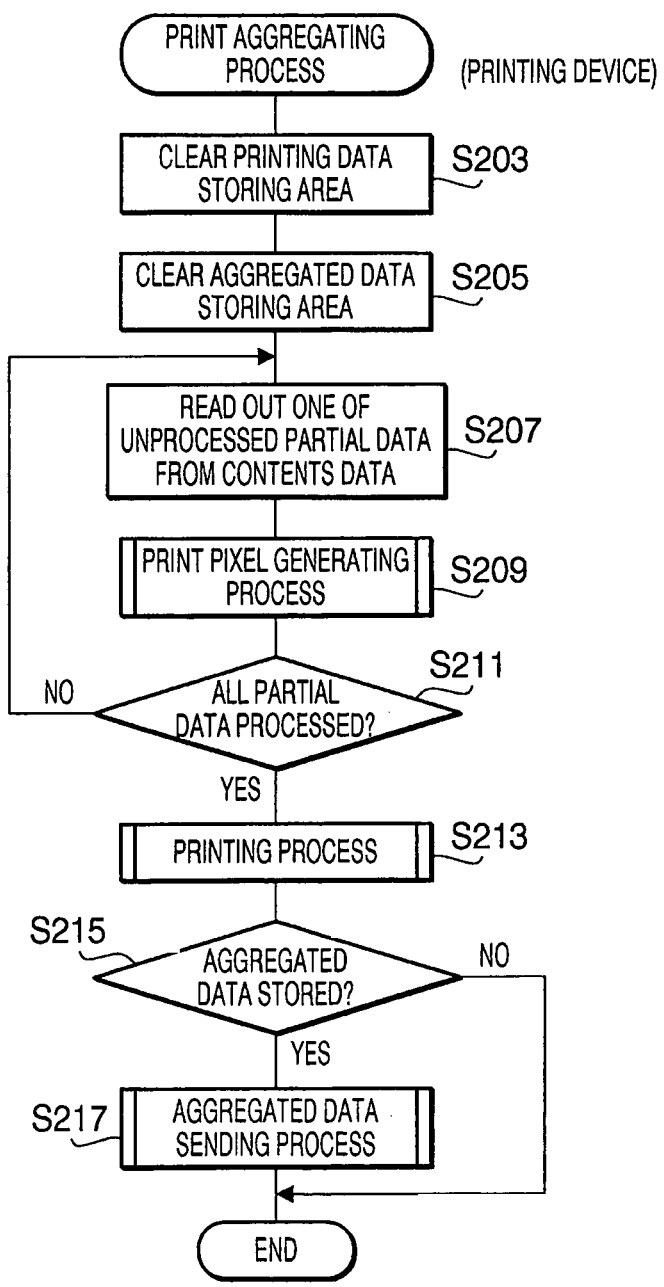

FIG. 8 is a flowchart showing a procedure of a print aggregating process in accordance with one or more aspects of the present invention.

Figure 9:
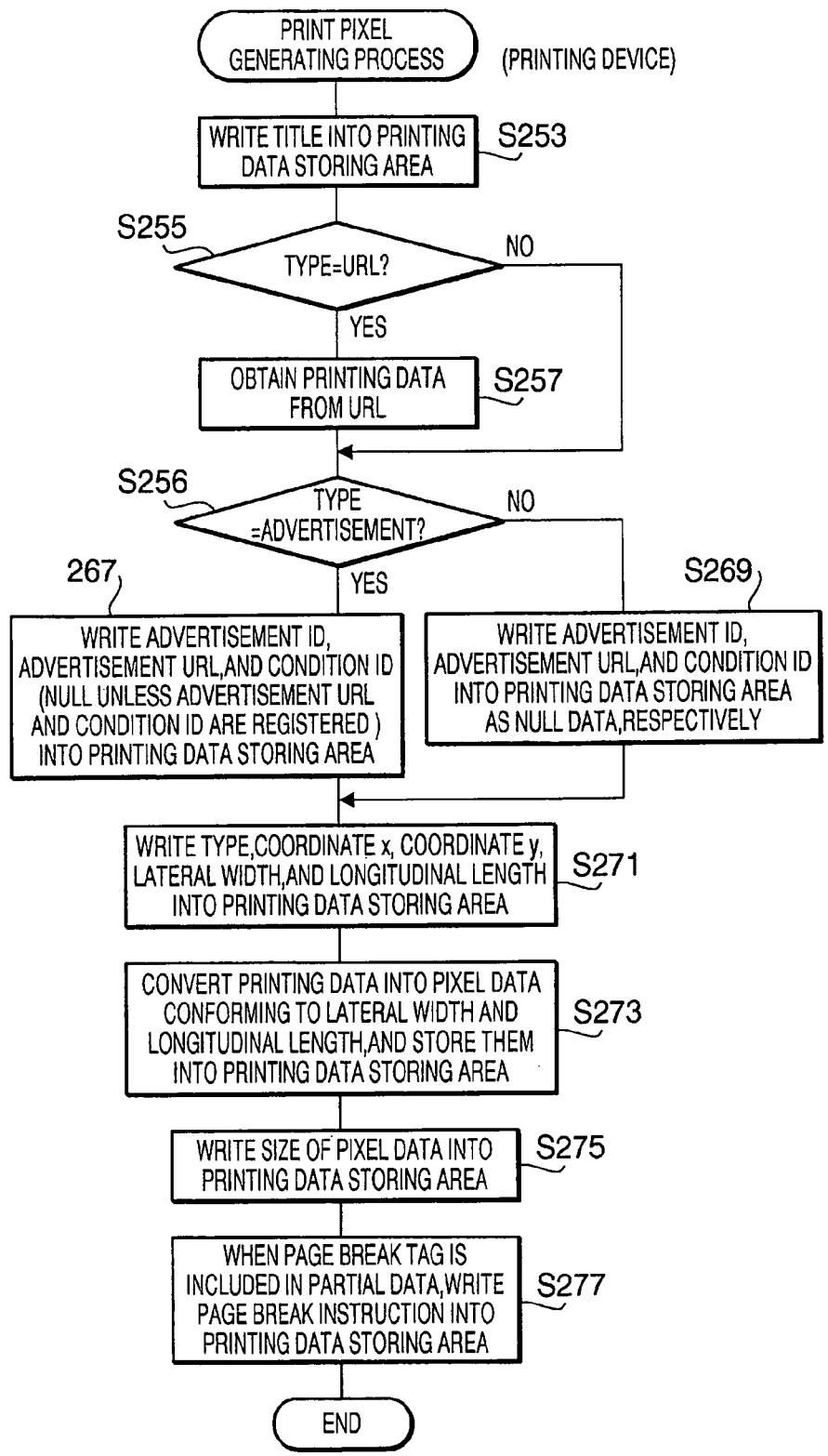

FIG. 9 is a flowchart showing a procedure of a print pixel generating process in accordance with one or more aspects of the present invention.

Figure 10:
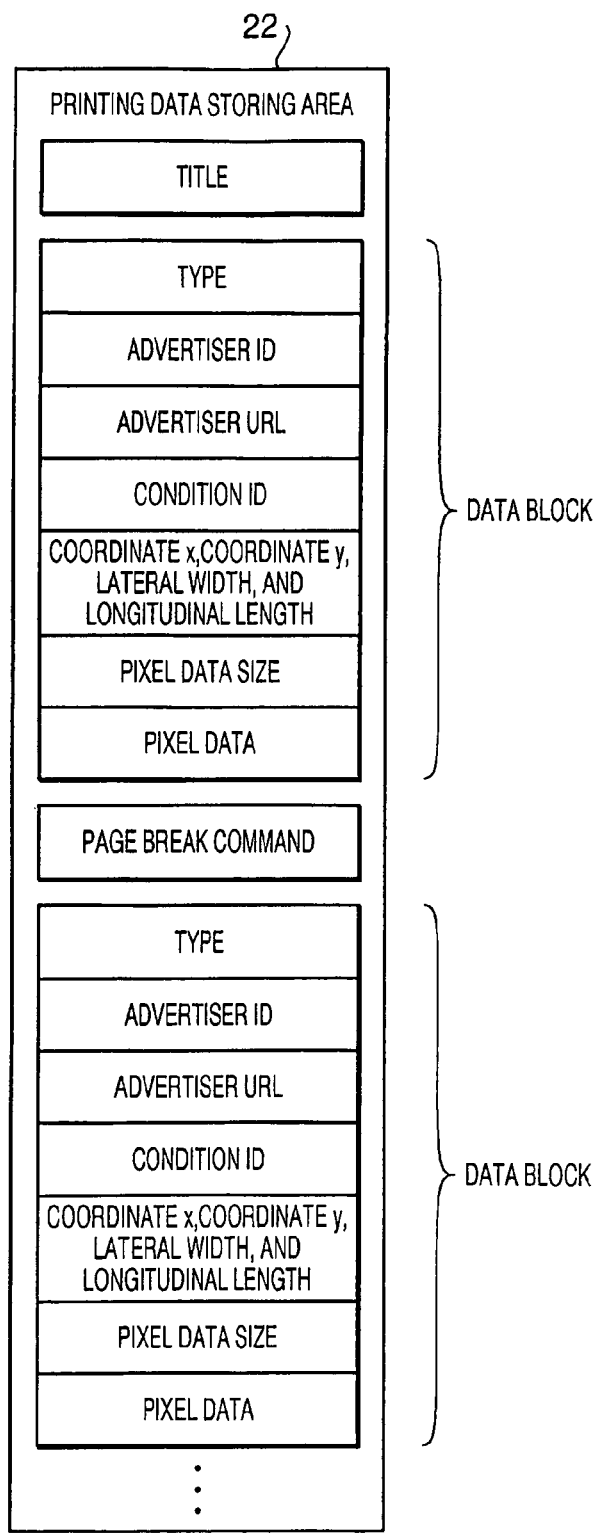

FIG. 10 is an illustration showing a data configuration of data stored in a printing data storing area in accordance with one or more aspects of the present invention.

Figure 11:
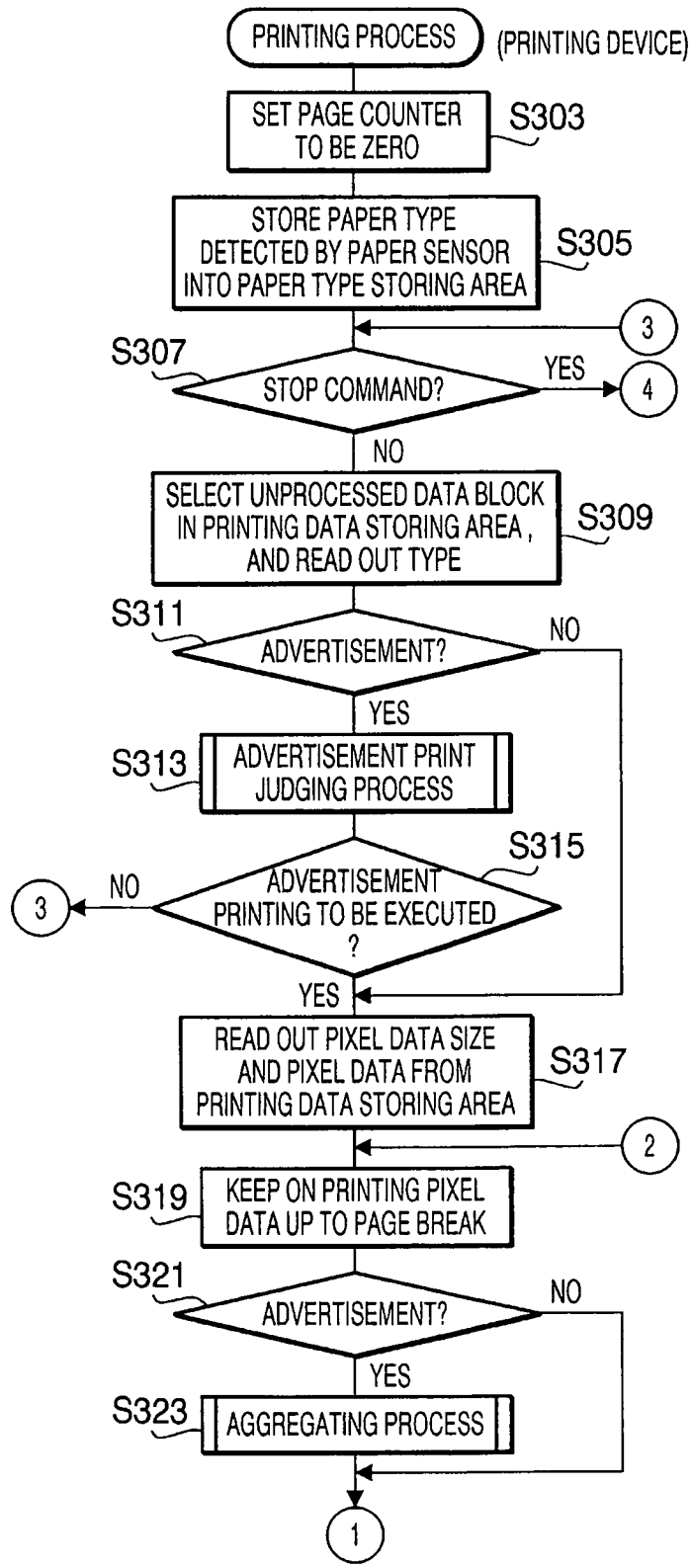
Figure 12:
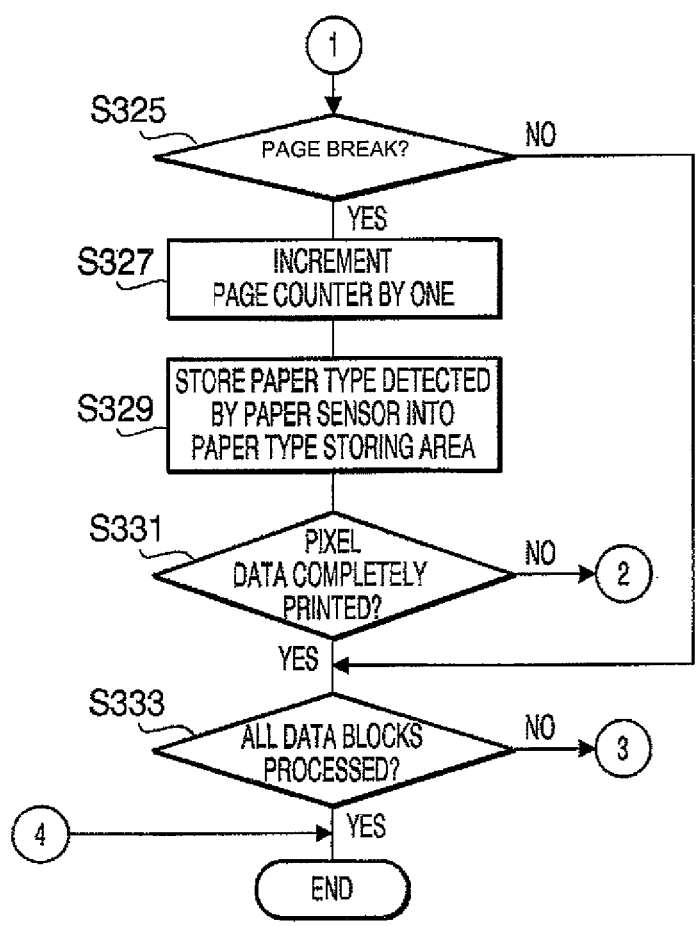

FIGS. 11 and 12 show a flowchart of a printing process in accordance with one or more aspects of the present invention.

Figure 13:
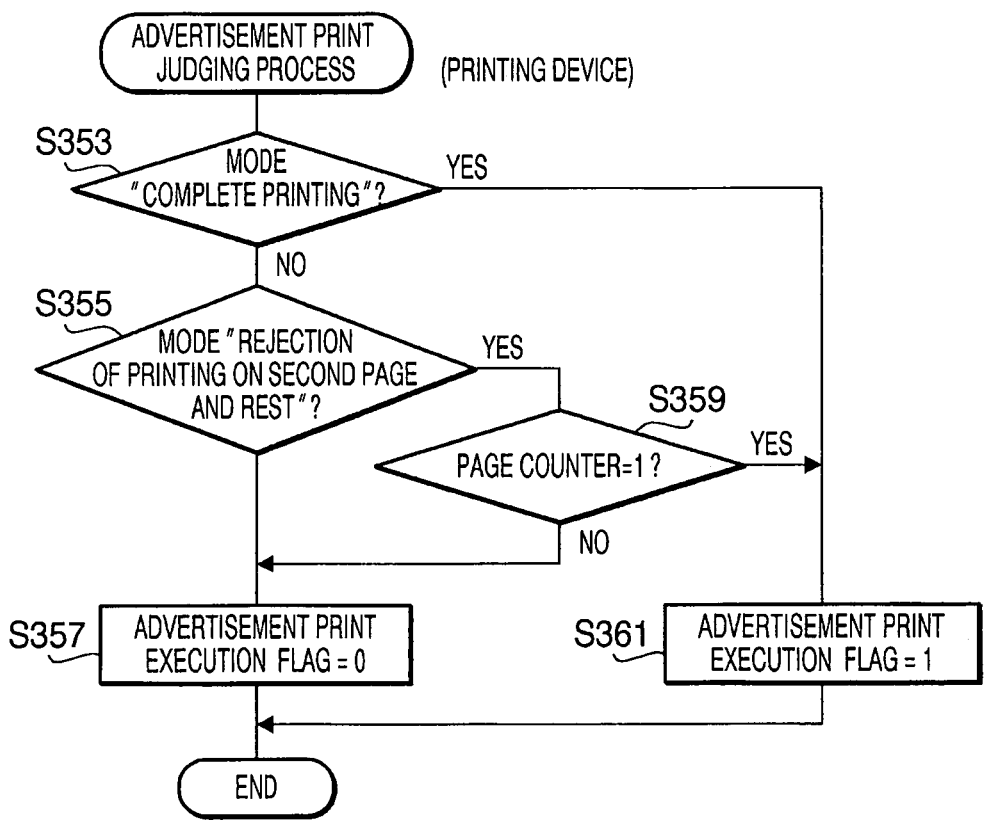

FIG. 13 is a flowchart showing a procedure of an advertisement print judging process in accordance with one or more aspects of the present invention.

Figure 14:
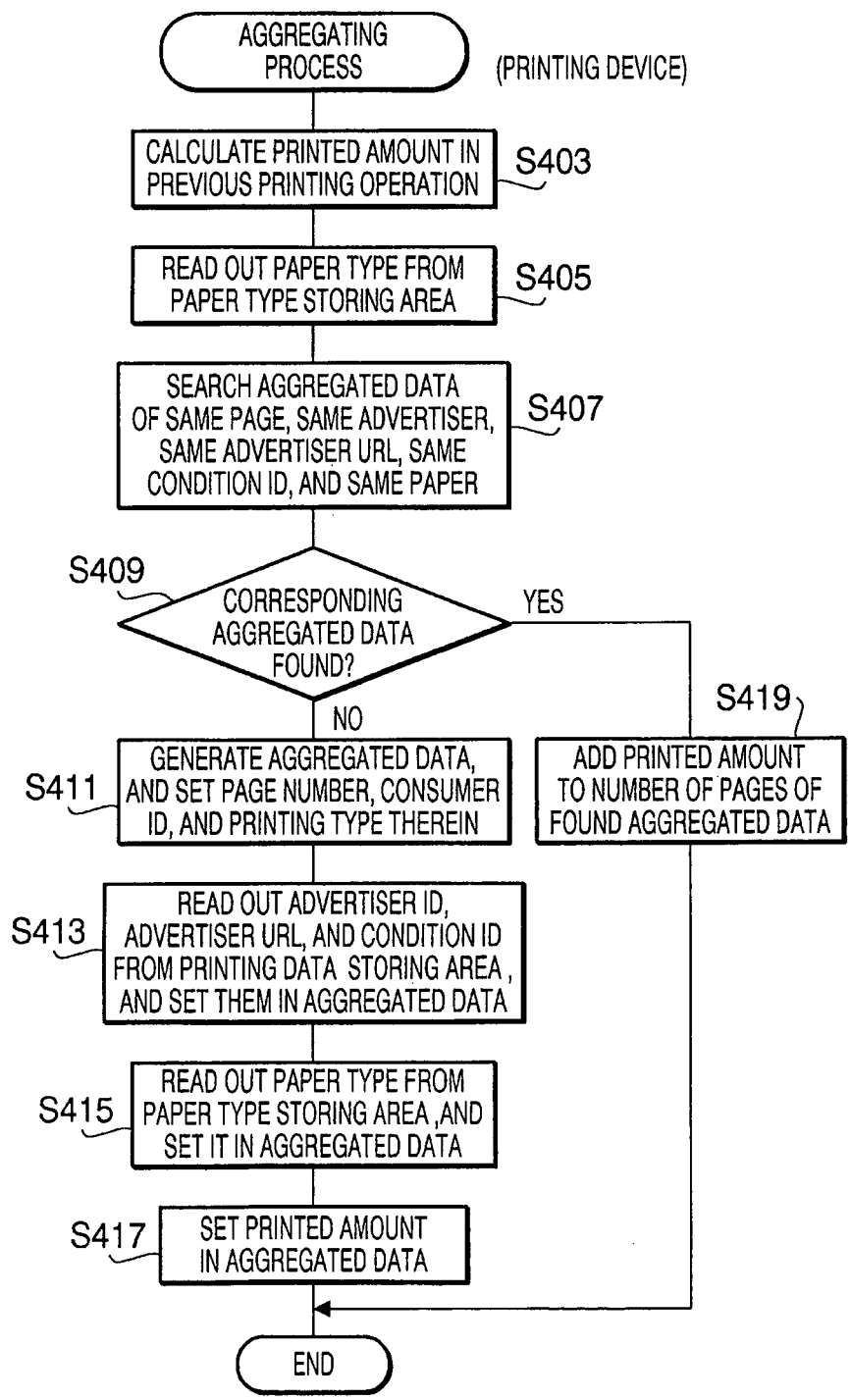

FIG. 14 is a flowchart showing a procedure of an aggregating process in accordance with one or more aspects of the present invention.

FIGS. 15A and 15B are examples of aggregated data in the case where an advertiser URL and condition ID are included therein and the case where none of the advertiser URL and the condition ID is included therein, respectively, in accordance with one or more aspects of the present invention.

Figure 16:
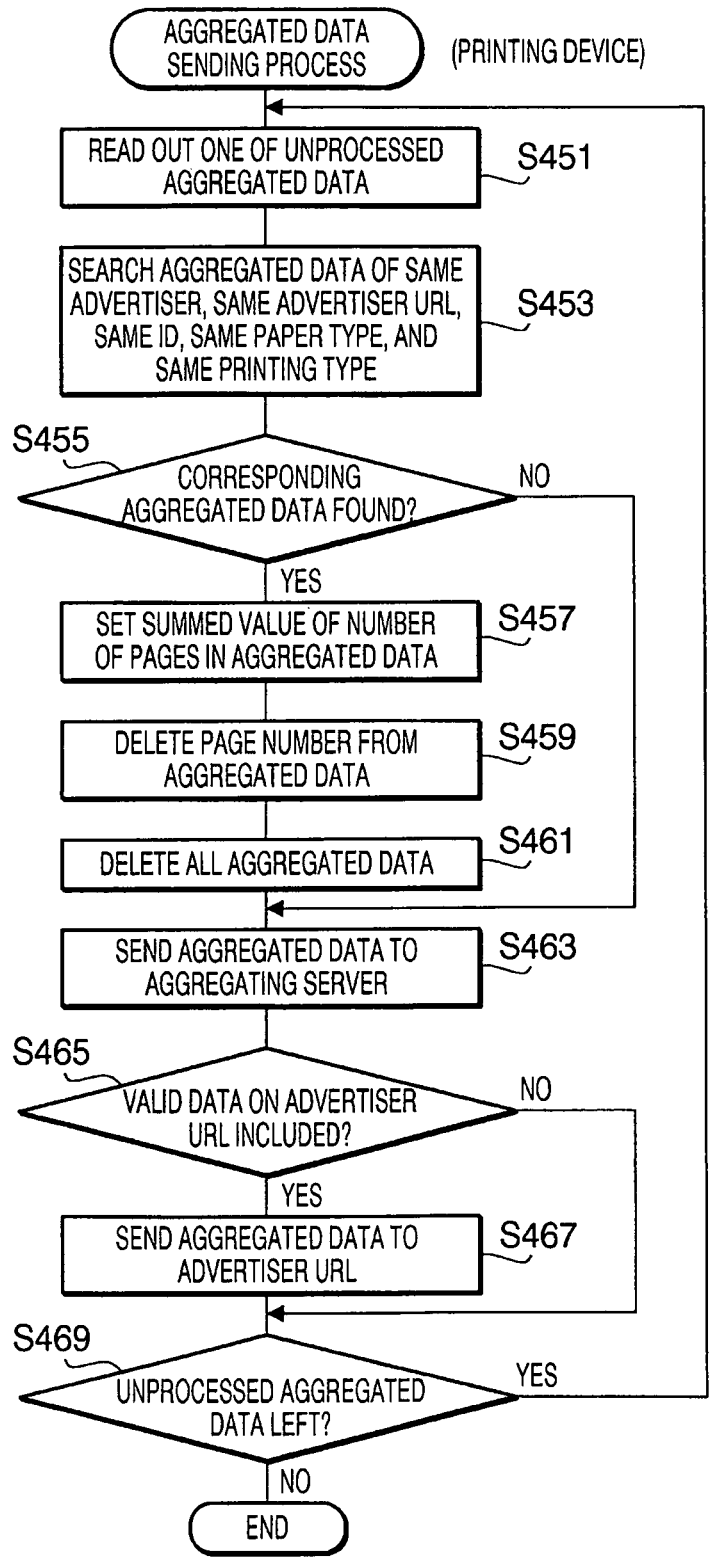

FIG. 16 is a flowchart showing a procedure of an aggregated data sending process in accordance with one or more aspects of the present invention.

Figure 17:
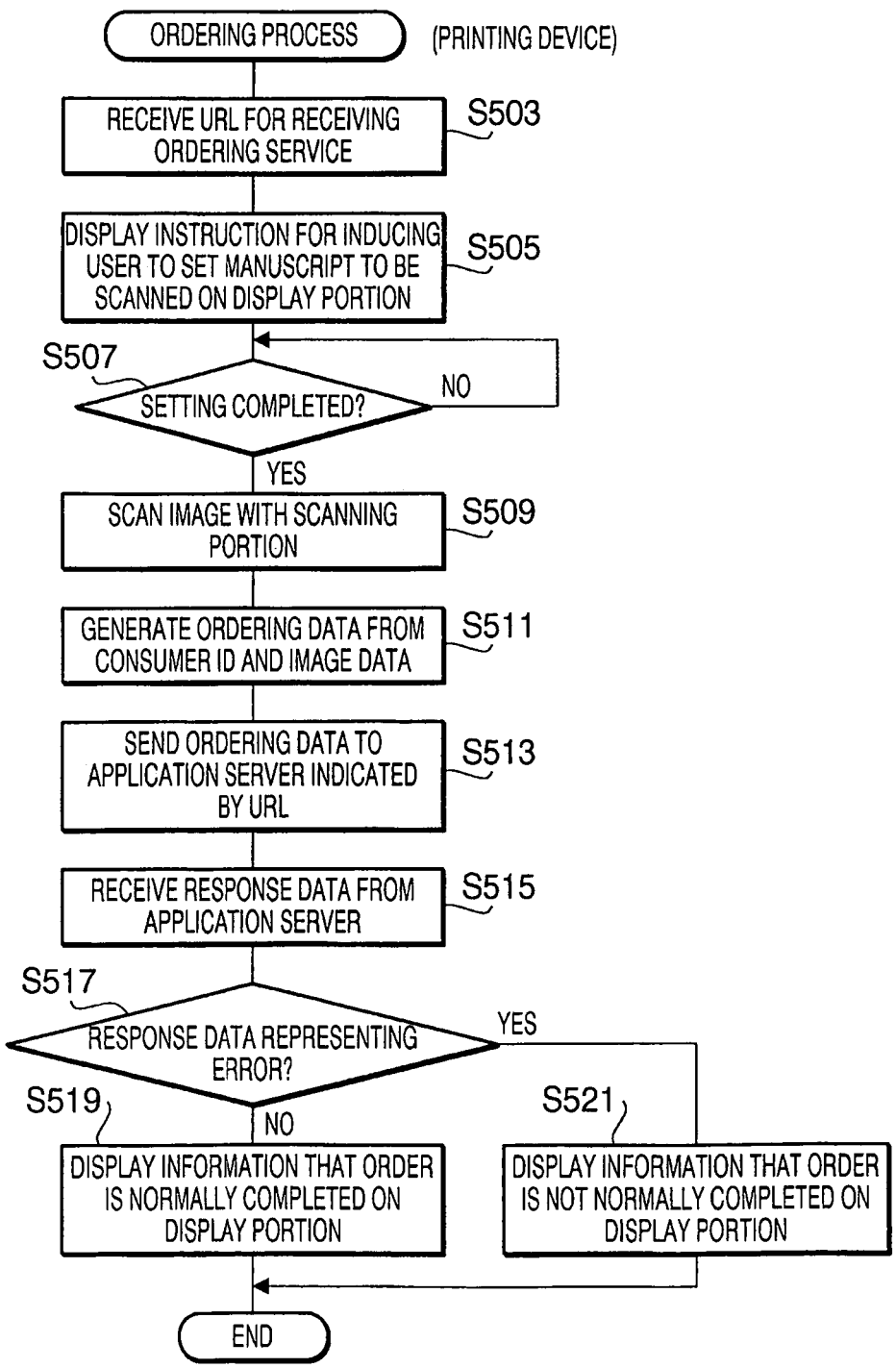

FIG. 17 is a flowchart showing a procedure of an ordering process in accordance with one or more aspects of the present invention.

FIG. 18 is a flowchart showing an advertisement print setting process in accordance with one or more aspects of the present invention.

FIG. 19 is a flowchart showing a procedure of an application server process in accordance with one or more aspects of the present invention.

Figure 20:
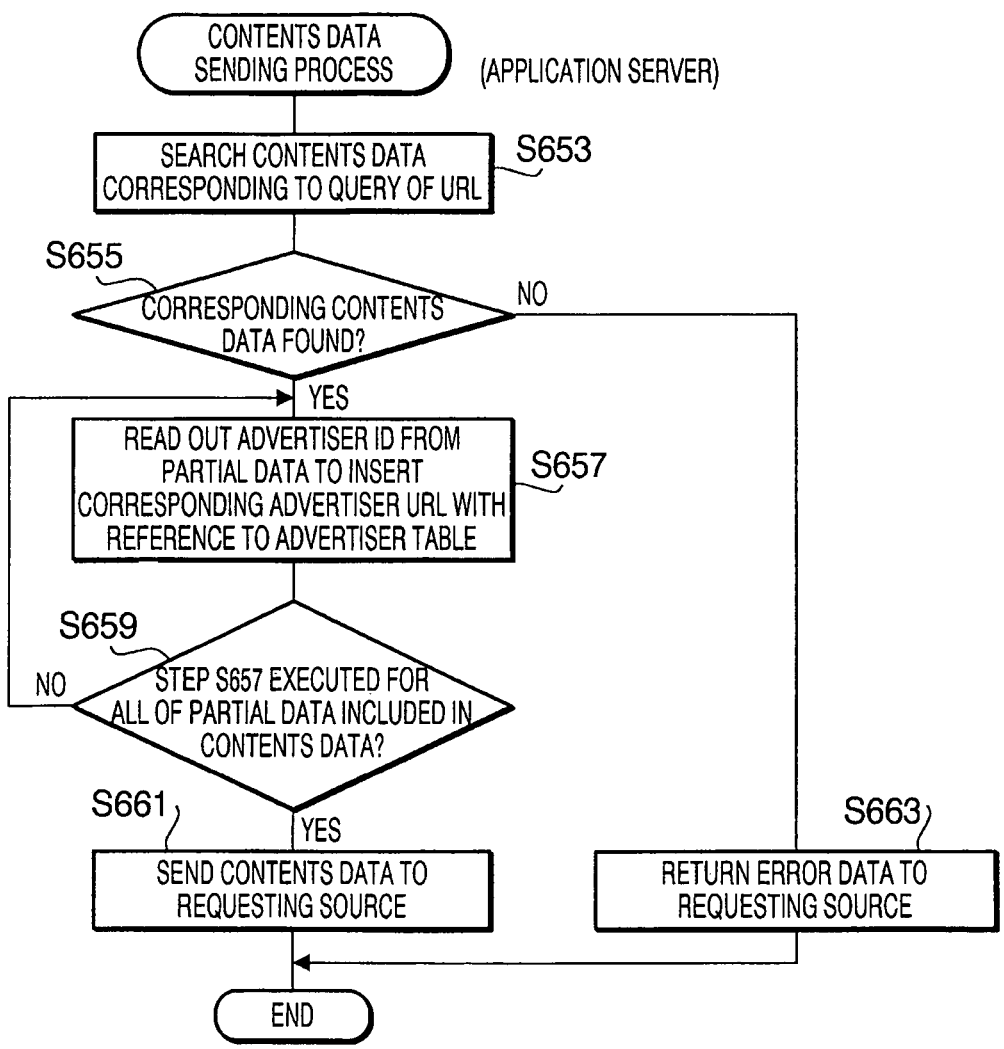

FIG. 20 is a flowchart showing a procedure of a contents data sending process in accordance with one or more aspects of the present invention.

Figure 21:
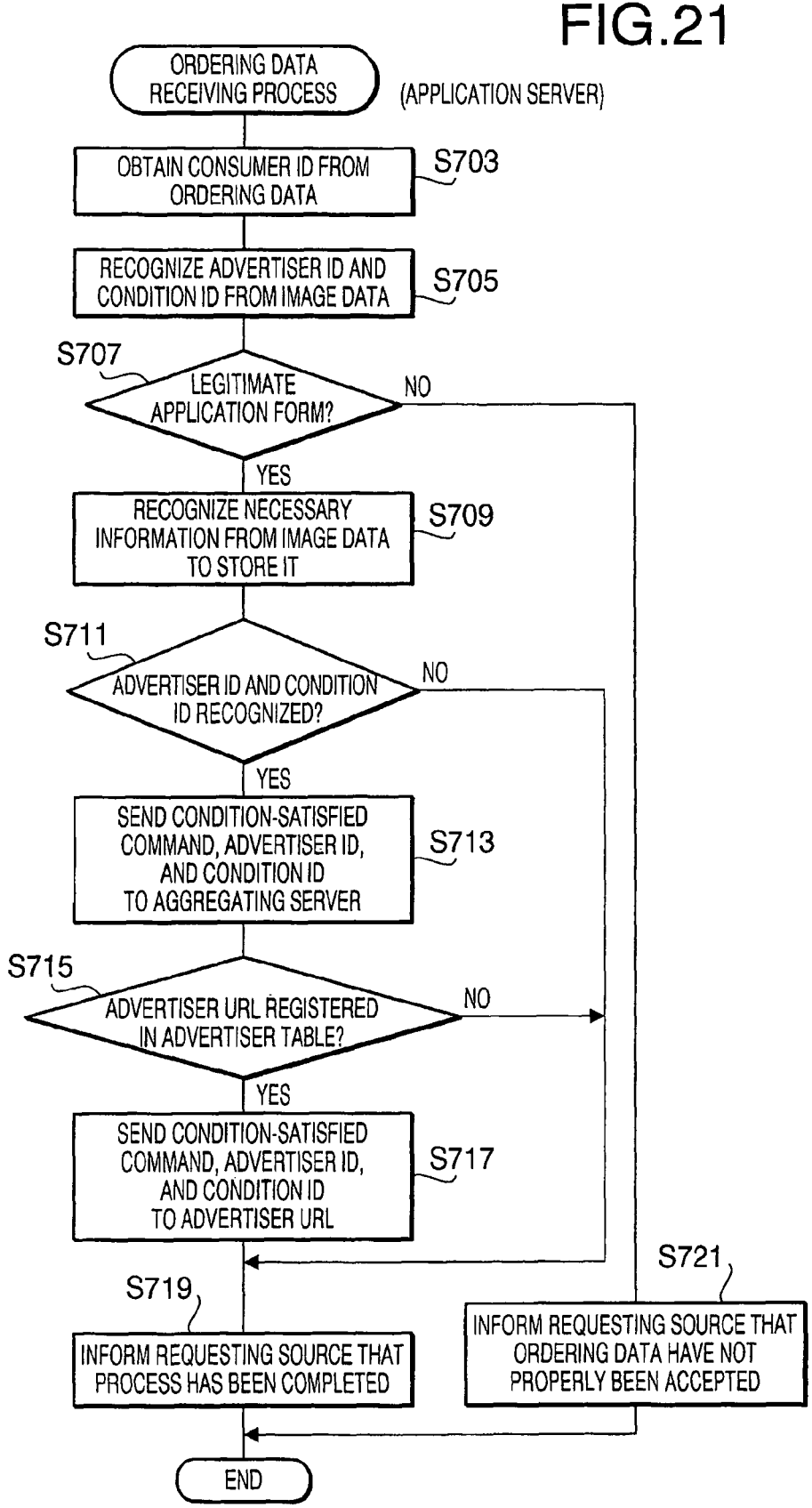

FIG. 21 is a flowchart showing a procedure of an ordering data receiving process in accordance with one or more aspects of the present invention.

Figure 22:
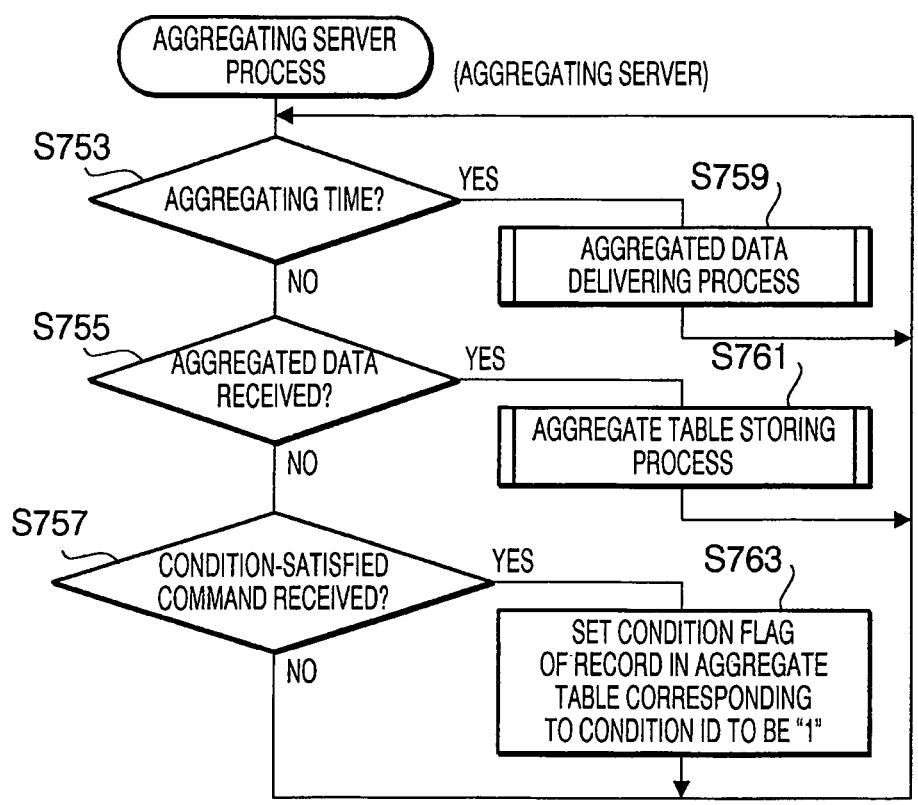

FIG. 22 is a flowchart showing a procedure of an aggregating server process in accordance with one or more aspects of the present invention.

Figure 23:
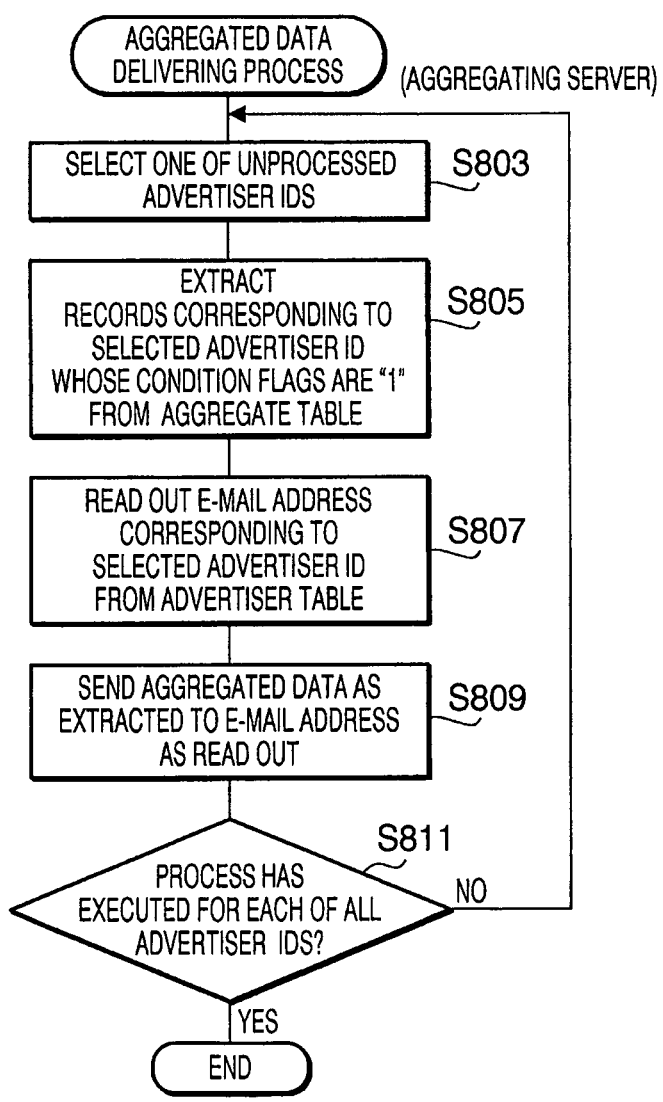

FIG. 23 is a flowchart showing a procedure of an aggregated data delivering process in accordance with one or more aspects of the present invention.

Figure 24:
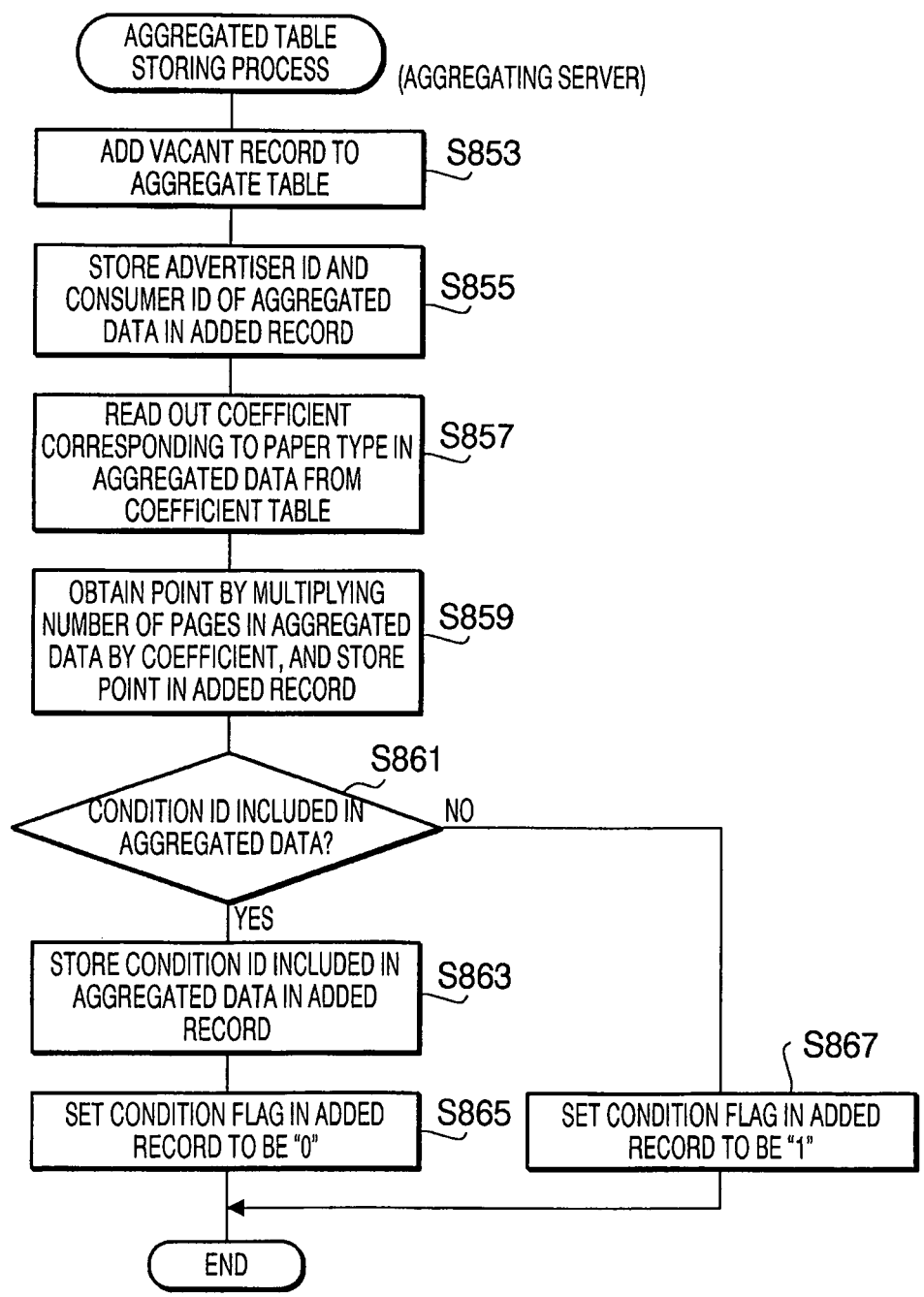

FIG. 24 is a flowchart showing a procedure of an aggregate table storing process in accordance with one or more aspects of the present invention.

Figure 25:
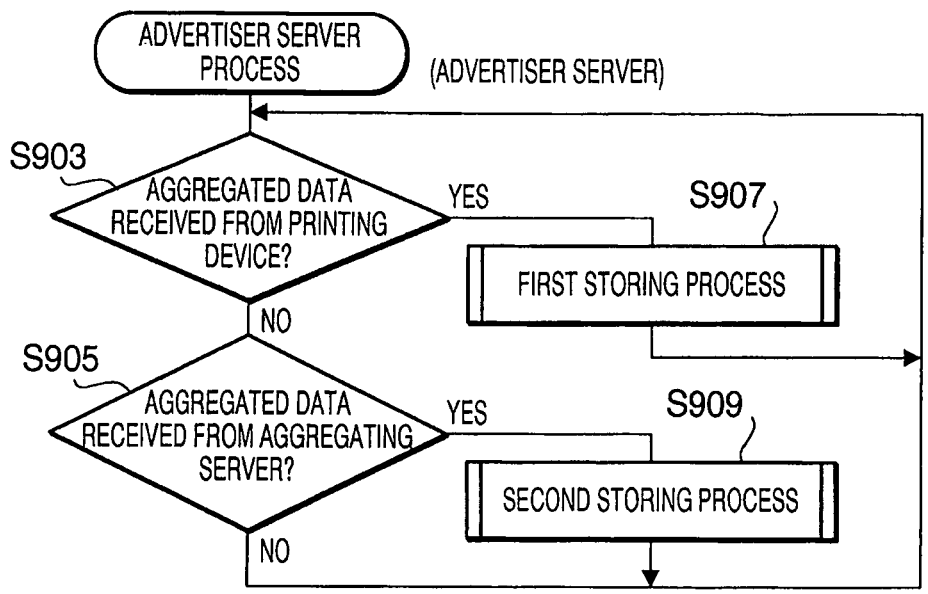

FIG. 25 is a flowchart showing a procedure of an advertiser server process in accordance with one or more aspects of the present invention.

Figure 26:
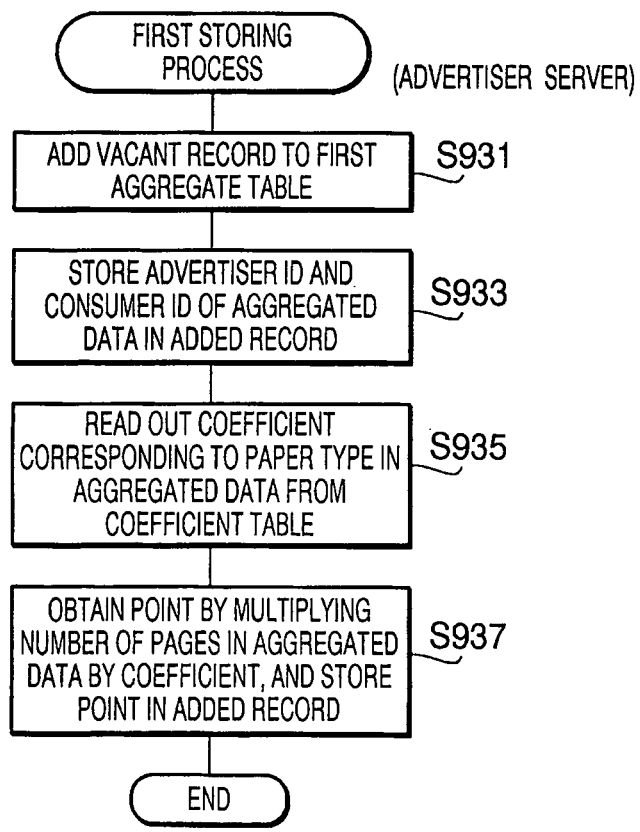

FIG. 26 is a flowchart showing a procedure of a first storing process in accordance with one or more aspects of the present invention.

Figure 27:
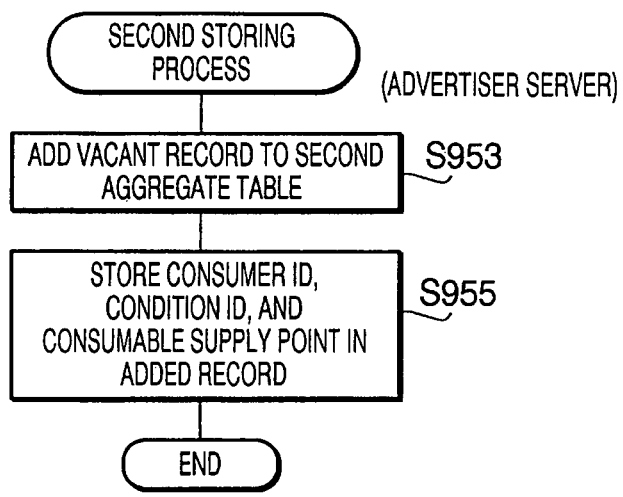

FIG. 27 is a flowchart showing a procedure of a second storing process in accordance with one or more aspects of the present invention.

Figure 28:
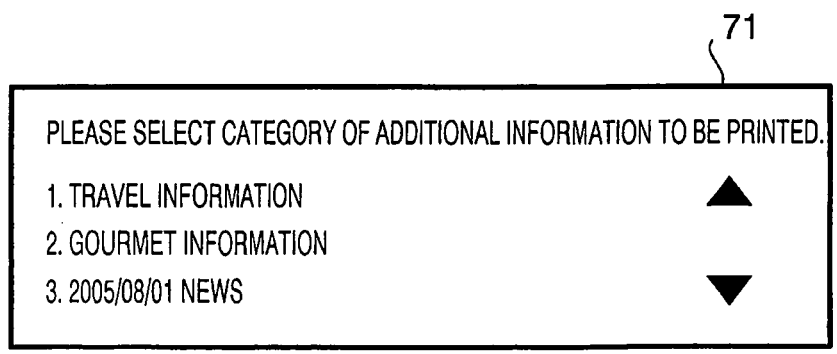

FIG. 28 is an example of a screen image for selecting a category in accordance with one or more aspects of the present invention.

FIG. 29A is another example of the coefficient table provided in the aggregating server or the advertiser server in accordance with one or more aspects of the present invention.

FIG. 29B is another example of the aggregated data in accordance with one or more aspects of the present invention.

FIG. 30A is another example of the aggregated data including values that enable to calculate a printed amount in accordance with one or more aspects of the present invention.

FIG. 30B is another example of the aggregated data including values that enable to calculate the printed amount in accordance with one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided a printing device, which comprises: a receiving system configured to receive printing data including first information, second information and provider-specifying information that specifies a provider of the second information, from an external apparatus; a printing system configured to perform printing based on the printing data received by the receiving system on a printing medium; an obtaining system configured to obtain printing information representing a predetermined parameter regarding printing of the second information performed by the printing system; a storing system configured to store the printing information obtained by the obtaining system and the provider-specifying information corresponding to the printing information; and a sending system configured to send the printing information and the provider-specifying information stored by the storing system to an aggregating server.

It is noted that the "first information" described here, for example, represents substantial main information in the information printed on the printing medium, i.e., information that a user of the printing device firstly wishes. In addition, the "second information", for example, represents substantial secondary information in the information printed on the printing medium, i.e., additional information such as advertisement information for the user of the printing device. It is noted that the above definitions are provided as examples. The definitions of the first and second information may be reversed. The first and second information may be given other definitions.

According to some aspects of the present invention, the printing information is aggregated to the aggregating server. Therefore, the provider of the second information (hereinafter, simply referred to as the "provider") can grasp information about printing of the second information (e.g., the number of printing times) using the printing information aggregated in the aggregating server. Hence, the provider can presume effects brought by the second information being printed. It is noted that, for example, the printing information aggregated in the aggregating server may be analyzed by an administrator of the aggregating server, and the analysis result may be provided to the provider. Alternatively, the printing information aggregated in the aggregating server may be sorted for different providers, and the sorted printing information may be analyzed by the respective providers.

In the meantime, a plurality of second information provided different providers is printed on a printing medium in some cases, and is printed on a plurality of printing mediums, respectively, in other cases. In such a situation, when the printing information and the provider-specifying information are stored in the storing system for each printing of the second information, a storing area of the storing system might be compressed. Further, the information sent to the aggregating server is inconvenient to use. In order to solve the above problems, optionally, the printing device may further comprise an aggregating system configured to aggregate the printing information obtained by the obtaining system for each of the provider-specifying information. In this case, the storing system may be configured to store the printing information aggregated by the aggregating system and the provider-specifying information corresponding to the printing information.

According to the printing device configured as above, the printing information is aggregated for each of the providers in each of the printing devices to be stored in the storing system. Thereby, a used storing area of the storing system can be saved in comparison with the case where the above configuration is not applied. Further, the printing information is sent to the aggregating server as being aggregated for each of the providers in each of the printing devices. Therefore, for example, the printing information aggregated for each of the providers that is not dependent on the printing device can be generated with a small amount of processing, and is convenient to use.

Further, there is considered a case where the user of the printing device does not temporarily wish to make the printing device print the second information. In such a case, optionally, the printing device may further comprise a printing instruction inputting system through which a printing instruction representing whether to make the printing system print the second information is inputted. Further optionally, the printing system may be configured to operate based on the printing instruction inputted through the printing instruction inputting system. It is needless to say that, when the printing instruction is an instruction for making the printing system print the second information, the printing system does not print the second information.

According to the printing device configured as above, when the user of the printing device does not wish to make the printing device print the second information, the printing of the second information can be prevented. Thereby, the printing device is more convenient for the user thereof to use.

Further, there is considered a case where the user of the printing device wishes to make the printing device print the second information in arbitrary pages even when making the printing device print the second information. In such a case, optionally, the printing instruction inputting system may be configured such that information on page numbers can be inputted therethrough. Further optionally, the printing system may be configured to operate based on the information on page numbers inputted through the printing instruction inputting system.

According to the printing device configured as above, the user of the printing device can print the second information on pages the user wishes. Namely, the user's wish for the pages on which the second information is to be printed can be reflected.

Further, there is considered a case where the user wishes to make the printing device print the second information in a specified category. Therefore, optionally, the printing device may further comprise a category inputting system through which a category of the second information to be printed by the printing system is inputted. In this case, the printing system may be configured to print the second information corresponding to the category inputted through the category inputting system.

According to the printing device configured as above, since the user can make the printing device print the second information in a specified category, the user can make the printing device print the second information conforming to user's taste. Consequently, wasteful consumption of the printing medium and/or image forming material can be saved, and further, effects of printing second information can be improved.

In addition, a management server configured to manage categories favored by each of the users or in each of the printing devices may separately provided, and favorite categories may previously be registered in the management server. In this case, the application server may inquire the categories of the management server, and may send the second information in a category suitable for the printing device as a destination of the second information to the printing device.

According to the printing device configured as above, the second information that conforms to the user's taste more can be printed by the printing device.

Optionally, the printing information obtained by the obtaining system may include information about at least one of an area of the second information printed on the printing medium, a data size of the second information, a number of times that the second information has been printed, a position of the second information printed on the printing medium, a type of the printing medium on which the second information has been printed, an amount of image-forming material used for printing the second information, and a time period taken for printing the second information.

Thereby, the provider of the second information can grasp how much the second information has been printed, and presume effects caused by printing of the second information.

According to another aspect of the present invention, there is provided a contents-providing system, which comprises at least one application server, at least one printing device, and at least one aggregating server. The application server comprises an application-server-side first sending system configured to send printing data including first information and second information and provider-specifying information that specifies a provider of the second information to the at least one printing device. The printing device comprises: a printing-device-side receiving system configured to receive the printing data from an application server; a printing system configured to perform printing based on the printing data received by the printing-device-side receiving system; an obtaining system configured to obtain printing information representing a predetermined parameter regarding printing of the second information performed by the printing system; a printing-device-side storing system configured to store the printing information obtained by the obtaining system and the provider-specifying information corresponding to the printing information; and a printing-device-side sending system configured to send the printing information and the provider-specifying information stored by the printing-device-side storing system to the aggregating server. The aggregating server comprises: an aggregating-server-side receiving system configured to receive information; an aggregating-server-side aggregating system configured to aggregate the printing information received by the aggregating-server-side receiving system for each of the provider-specifying information; and an aggregating-server-side storing system configured to store the printing information aggregated by the aggregating-server-side aggregating system for each of the provider-specifying information and the provider-specifying information corresponding to the printing information.

In the contents-providing system configured as above, it is assumed that one or more printing devices are included. Further, the contents-providing system may include one or more application servers and one or more aggregating servers. In addition, the application server and aggregating server may be installed in a single housing.

According to the contents-providing system configured as above, the same effects as those caused by the aforementioned printing device can be expected.

Optionally, the aggregating server may further comprise an aggregating-server-side sending system configured to send the printing information corresponding to a provider specified by the provider-specifying information stored in the aggregating-server-side storing system to a provider server of the specified provider.

According to the contents-providing system configured as above, the provider can more easily confirm the printing information by referring to the printing information sent to the server of itself (provider server) without extracting the printing information in connection with itself from the printing information aggregated in the aggregating server.

Optionally, the printing-device-side sending system may be configured to send the printing information corresponding to a provider specified by the provider-specifying information stored in the printing-device-side storing system to a provider server of the specified provider.

According to the contents-providing system configured as above, the provider can compare the printing information directly sent to the server of itself (provider server) from the printing device with the printing information aggregated in the aggregating server, and thereby, can check whether the printing information is proper.

In the meantime, there is considered a case where the printing information sent to the aggregating server is desired to be treated as valid information when a specified condition is satisfied. For example, there are cited as such a case a case where the user obtains detailed information on the advertisement based on the advertisement information previously printed, and a case where the user applies based on an application form previously printed.

In this case, optionally, a condition ID used for judging whether the printing information and provider-specifying information received by the aggregating server are valid is included in specified data of the printing data sent by the application-server-side first sending system. Still optionally, the application server may comprise an application-server-side second sending system configured to send the condition ID to the aggregating server in response to a predetermined condition being satisfied. Yet optionally, the printing-device-side sending system is configured to send the condition ID together with the printing information and the provider-specifying information to the aggregating server in response to the printing data received by the printing-device-side receiving system including the condition ID. Further optionally, the aggregating-server-side aggregating system may be configured to aggregate the printing information and the provider-specifying information sent from the printing device as valid information in response to the condition ID sent from the printing device and received by the aggregating-server-side aggregating system being identical to the condition ID sent from the application server and received by the aggregating-server-side aggregating system. The case where a "predetermined condition" is satisfied as described here represents a case where a certain operation has been performed by the user of the printing device based on the second information previously sent. Specifically, for example, there are cited as such a case the aforementioned cases, namely, the case where the user obtains detailed information on the advertisement based on the advertisement information previously printed, and the case where the user applies based on an application form previously printed.

According to the contents-providing system configured as above, when a predetermined condition is satisfied, the printing information can be treated as valid information in the aggregating server.

In such a case, optionally, the application-server-side second sending system may be configured to send the condition ID to a provider server of a provider specified by the provider-specifying information included in the printing data sent from the application-server-side first sending system in response to a predetermined condition being satisfied. Further optionally, the printing-device-side sending system may be configured to send the printing information and the condition ID to a provider server of a provider specified by the provider-specifying information included in the printing data received by the printing-device-side receiving system in response to the printing data including the condition ID. The case where a "predetermined condition" is satisfied as described here represents a case where a certain operation has been performed by the user of the printing device based on the second information previously sent. Specifically, for example, there are cited as such a case the aforementioned cases, namely, the case where the user obtains detailed information on the advertisement based on the advertisement information previously printed, and the case where the user applies based on an application form previously printed.

According to the contents-providing system configured as above, the provider can check whether the printing information is proper by comparing the condition ID directly sent to the server of itself (provider server) from the printing device with the condition ID directly sent to the server of itself from the application server.

In the meantime, the printing device included in the aforementioned contents-providing system may be replaced with another contents (image) outputting device such as a display device. Namely, according to a further aspect of the present invention, there is provided a contents-providing system, which comprises at least one application server, at least one outputting device, and at least one aggregating server. The application server comprises an application-server-side first sending system configured to transmit outputting data including first information, second information and provider-specifying information specifying a provider of the second information to the outputting device. The outputting device comprises: an outputting-device-side receiving system configured to receive, from the application server, the outputting data; an outputting system configured to perform an outputting operation based on the outputting data received by the receiving system; an obtaining system configured to obtain outputting information representing a predetermined parameter regarding the outputting operation for outputting the second information; an outputting-device-side storing system configured to store the outputting information obtained by the obtaining system and the provider-specifying information corresponding to the outputting information in response to outputting of the second information; and an outputting-device-side sending system configured to output the outputting information and the provider-specifying information stored by the outputting-device-side storing system to the aggregating server. The aggregating server comprises: an aggregating-server-side receiving system configured to receive the outputting information; an aggregating-server-side aggregating system configured to aggregate the outputting information received by the aggregating-server-side receiving system for each of the provider-specifying information; and an aggregating-server-side storing system configured to store the outputting information aggregated by the aggregating-server-side aggregating system for each of the provider-specifying information and the provider-specifying information corresponding to the outputting information.

According to the contents-providing system configured as above, the same effects as those caused by the aforementioned printing device or the aforementioned contents-providing system can be expected.

According to a further aspect of the invention, there is provided a computer usable medium comprising computer readable instructions stored therein that cause a computer to execute steps of: receiving printing data including first information, second information, and provider-specifying information that enables to specify a provider of the second information from an application server; performing printing based on the printing data received in the step of receiving; obtaining printing information representing a predetermined parameter regarding printing of the second information performed in the step of performing printing; storing the printing information obtained in the step of obtaining and the provider-specifying information corresponding to the printing information; and sending the printing information and the provider-specifying information stored in the step of storing to an aggregating server.

By making the computer execute the instructions stored in the computer usable medium configured as above, the same effects as those caused by the aforementioned printing device can be expected.

Illustrative Aspects

Hereinafter, illustrative aspects according to the present invention will be described with reference to the accompanying drawings. It is noted that the present invention is not limited to the following illustrative aspects, and that various sorts of modifications may be possible within a technical scope of the present invention.

Explanations of Configurations

Figure 1:
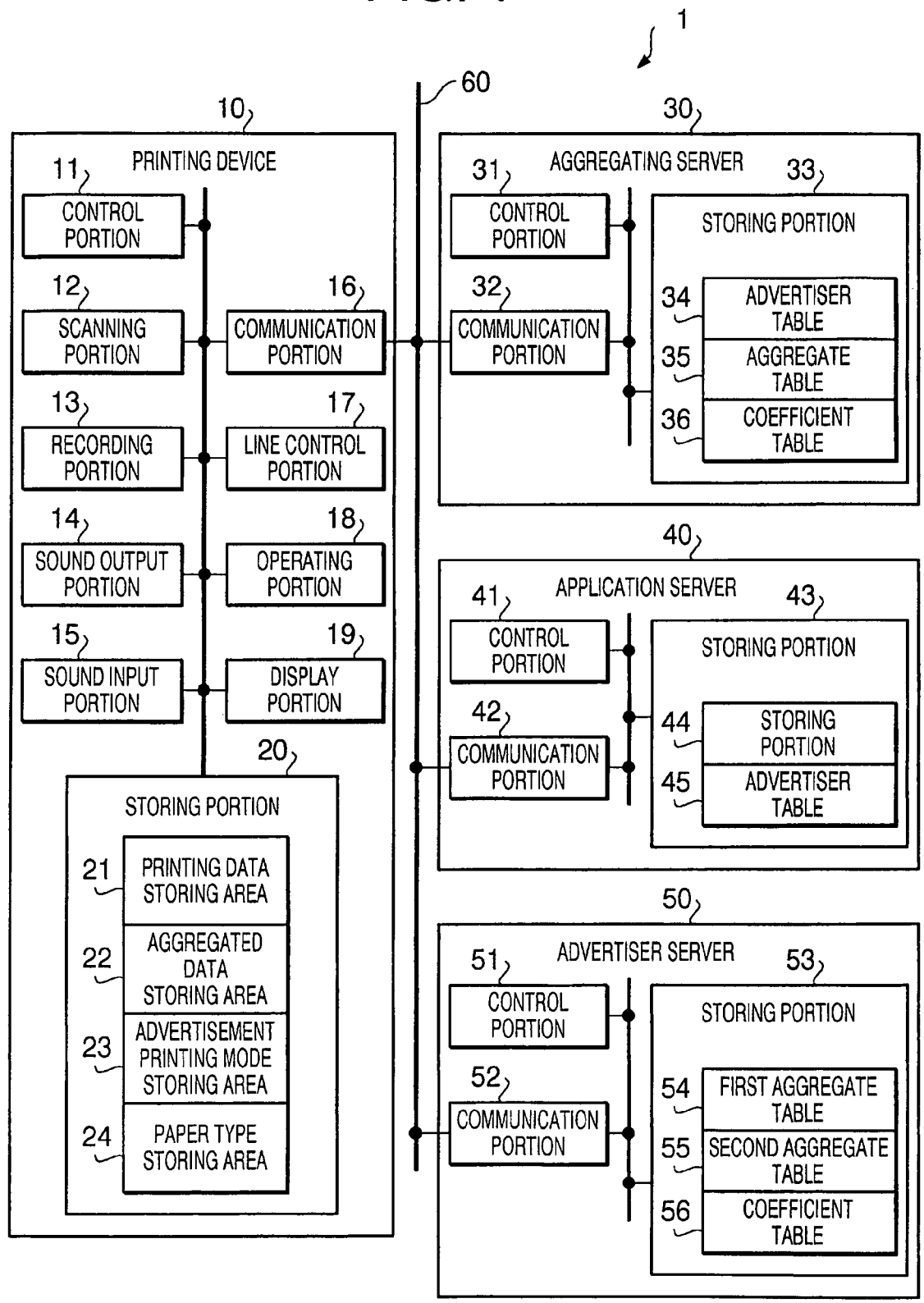

Firstly, a schematic configuration of a contents-providing system 1 will be explained referring to a block diagram shown in FIG. 1.

The contents-providing server 1 includes a printing device 10, aggregating server 30, application server 40, and advertiser server 50. The above constituent elements included in the contents-providing server 1 are interconnected two-way-communicably via a network 60 (a wide area network such as an Ethernet in the illustrative aspect). It is noted that, although there are only shown in FIG. 1 one printing device 10, one application server 40, and one advertiser server 50, two or more printing devices 10, two or more application servers 40, and two or more advertiser servers 50 actually exist.

The printing device 10 has a telephone (sound communication) function, scanning function, printing function, copying function, facsimile function, and the like. In the contents-providing system 1, the printing device 10 is configured to use a plurality of services relating to the above functions via the network 60. More specifically, the printing device 20 is configured to request the application server 40 provided on the network 60 to send contents and print the contents sent from the application server 40. Further, in the contents-providing system 1, the printing device 10 is configured to send printing information in the case of printing the contents to the aggregating server 30 via the network 60. On the other hand, the aggregating server 30 is configured to aggregate the printing information sent from the printing device 10.

Next, a configuration of each of the printing device 10, aggregating server 30, application server 40, and advertiser server 50 will be described.

(1) Printing Device

The printing device 10 is provided with a control portion 11, scanning portion 12, recording portion 13, sound output portion 14, sound input portion 15, communication portion 16, line control portion 17, operating portion 18, display portion 19, and storing portion 20.

The control portion 11 is provided with widely-known CPU, ROM, RAM, and the like (any not shown), and is configured to take overall control of each of the portions included in the printing device 10. In addition, there are stored in the ROM programs for rendering the CPU execute the below-mentioned various kinds of processes.

The scanning portion (scanner) 12 is configured to scan an image as recorded (for example, printed) on a sheet-like recording medium such as a paper, and generate image data representing the image.

The recording portion (printer) 13 is configured to print the image represented by the image data by fixing image-generating material such as ink and toner on a sheet-like printing medium such as a paper.

The sound output portion 14 is configured to output sound represented by sound data (PCM data) from a speaker provided in a handset (both not shown) or a speaker (not shown) provided in a main body of the printing device 10.

The sound input portion 15 is configured to input sound through a microphone provided in a handset (receiver, not shown) included in the printing device 10, and generates sound data (PCM data) representing the sound.

The communication portion 16 is configured to execute processes for sending and receiving data via the network 60.

The line control portion 17 is configured to control input of the sound data (PCM data) from an outside of the printing device 10 and output of the sound data (PCM data) to the outside of the printing device 10.

The operating portion 18 is configured to accept an input operation performed by a user of the printing device 10 through an operation panel (not shown) provided in the main body of the printing device 10. The operating portion 18 includes various kinds of buttons such as number buttons and an execution button.

The display portion 19 is provided in the main body of the printing device 10, and is configured to display information on the printing device 10 for the user.

The storing portion 20 includes a non-volatile RAM (not shown, may alternatively be a hard disk drive), which is configured to store various kinds of data. More specifically, the storing portion 20 includes a printing data storing area 21 for temporarily storing printing data and the like, aggregated data storing area 22 for temporarily storing aggregated data, advertisement printing mode storing area 23 for storing an advertisement printing mode, and paper type storing area 24 for storing the type of paper. Concrete example of data stored in each of the storing areas will be described later.

(2) Aggregating Server 30

Next, a configuration of the aggregating server 30 will be explained. The aggregating server 30 is configured with a computer having a sufficient processing capability, which is provided with a control portion 31, communication portion 32, and storing portion 33.

The control portion 31 includes widely known CPU, ROM, RAM, and the like (any not shown), and is configured to take overall control of each of the portions included in the aggregating server 30. It is noted that the ROM stores programs for rendering the CPU execute the below-mentioned various kinds of processes.

The communication portion 32 is configured to execute processes for sending and receiving data via the network 60.

The storing portion 33 includes a hard disk drive (not shown) configured to store data. More specifically, there are stored in the hard disk drive an advertiser table 34, aggregate table 35, and coefficient table 36.

Here, a concrete example of a configuration of the advertiser table 34 will be described with reference to FIG. 2A. A record in the advertiser table 34 is configured with an advertiser ID for identifying an advertiser, and an e-mail address used when sending the aggregated data to the advertiser represented by the advertiser ID. Two or more records thus configured are registered in the advertiser table 34.

Next, a concrete example of a configuration of the aggregate table 35 will be explained with reference to FIG. 2B. A record in the aggregate table 35 is configured with an advertiser ID for identifying the advertiser, a consumer ID for identifying the user of the printing device 10, a consumable supply point representing a used amount of a consumable supply, a condition ID used when judging whether the record is valid or not, and a condition flag representing whether the record is valid or not. The aggregate table 35 is configured capable of registering two or more records thus configured therein.

Next, a concrete example of a configuration of the coefficient table 36 will be explained with reference to FIG. 2C. A record of the coefficient table 36 is configured with a paper type representing the type of a printing paper, and a coefficient corresponding to the paper type. The coefficient table 36 is configured capable of registering two or more records thus configured therein.

(3) Application Server 40

Subsequently, a configuration of the application server 40 will be explained referring to FIG. 1 again. The application server 40 is configured with a computer having a sufficient processing capability, which is provided with a control portion 41, communication portion 42, and storing portion 43.

The control portion 41 is provided with widely known CPU, ROM, RAM, and the like (any not shown), and takes overall control of each of the portions included in the application server 40. In addition, The ROM stores programs for rendering the CPU execute the below-mentioned various kinds of processes.

The communication portion 42 is configured to execute processes for sending and receiving data via the network 60.

The storing portion 43 is provided with a hard disk drive (not shown) that stores data. More specifically, there are stored in the storing portion 43 a contents database (DB) 44 and advertiser table 45.

Here, a concrete example of the advertiser table 45 will be described with reference to FIG. 3A. A record in the advertiser table 45 is configured with an advertiser ID for identifying the advertiser, and an advertiser URL representing a destination of a web site administrated by the advertiser. Two or more records thus configured are registered in the advertiser table 45.

In the meantime, the contents DB 44 is a database in which contents data to be sent to the printing device 10 are got together. With the contents data being sent to the printing device 10 in response to a request issued from the printing device 10, the printing device 10 prints out the contents based on the contents data sent from the application server 40.

Here, a concrete example of the contents data will be explained. FIG. 3B is an illustration showing an example of a configuration of the contents data. As shown in FIG. 3B, the contents data are described in an extensible markup language (XML). The contents data are divided into a plurality of partial data (three partial data in the example shown in FIG. 3B) by tags. The partial data are intended to define a content of each of partial images in a contents image printed based on the contents data, and are classified into a category of "advertisement" or "general". Further, coordinates and a size of the partial data to be printed out are defined in the partial data.

When the type of the partial data is "advertisement", the partial data represent data regarding an advertisement provided by an advertisement provider (advertiser). In the partial data, there are defined by the tags an "advertiser ID" that is an identification information for identifying the advertiser, "advertiser URL" representing the destination of the web site administrated by the advertiser, "condition ID" used when the aggregating server 30 judges whether the aggregated data are valid or not, "printing data" representing the type and content of the printing data. It is noted that the "advertiser URL" and "condition ID" may not be defined in some partial data of "advertisement".

When the type of the partial data is "general", the partial data represent data on the contents provided by an administrator of the application server 40. In the partial data, there are defined by the tags an "administrator ID" for identifying the administrator of the application server 40, and "printing data" representing the type and content of the printing data.

With the contents data thus configured being sent to the printing device 10 from the application server 40 in response to the request issued from the printing device 10, the printing device 10 prints out the contents image based on the contents data sent from the application server 40.

Figure 4B:
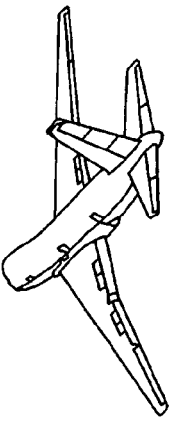
FIGS. 4A and 4B are examples of contents images printed by a printing device, respectively, in accordance with one or more aspects of the present invention.
Figure 4A:
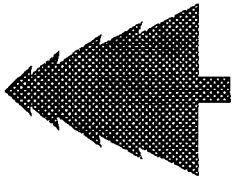

FIG. 4A shows an example of the contents image printed by the printing device 10. A partial image 61 (Information on Travel to Hawaii) in a contents image shown in FIG. 4A is an advertisement image corresponding to the first partial data in the contents data shown in FIG. 3B. In addition, a partial image 62 is an image representing a main content corresponding to the second partial data in the contents data shown in FIG. 3B. Further, a partial image 63 "∘∘ real estate" is an advertisement image corresponding to the third partial data in the contents data shown in FIG. 3B.

When the user of the printing device 10 who has seen the contents image shown in FIG. 4A inputs a URL shown in the field of "Information on Travel to Hawaii" into the printing device 10, a contents image as shown in FIG. 4B (actually, contents data) is sent to the printing device 10 from the application server 40. It is noted that the contents image shown in FIG. 4B includes the condition ID at an upper right area, the advertiser ID at a lower left area, a form code (a code representing the type of an application form as this example) coded into a barcode at an upper left area.

(4) Advertiser Server 50

Next, a configuration of the advertiser server 50 will be explained referring to FIG. 1 again. The advertiser server 50 is a server administrated by the advertiser who provides the advertisement included in the contents to be sent to the printing device 10 from the application server 40. The advertiser server 50 is configured with a computer having a sufficient processing capability, and is provided with a control portion 51, communication portion 52, and storing portion 53.

The control portion 51 includes widely known CPU, ROM, RAM, and the like (any not shown), and takes overall control of each of the portions included in the advertiser server 50. In addition, the ROM stores programs for rendering the CPU execute the below-mentioned various kinds of processes.

The communication portion 52 is configured to execute a process for sending and receiving data via the network 60.

The storing portion 53 is provided with a hard disk drive (not shown), which stores data. More specifically, there are stored in the storing portion 53 a first aggregate table 54, second aggregate table 55, and coefficient table 56.

Here, a concrete example of a configuration of the first aggregate table 54 will be explained with reference to FIG. 5A. A record in the first aggregate table 54 is configured with the advertiser ID for identifying the advertiser, the consumer ID for identifying the user of the printing device 10, the consumable supply point representing the used amount of the consumable supply, the condition ID used when judging whether the record is valid or not, and the condition flag representing whether the record is valid or not. The first aggregate table 54 is configured capable of registering two or more records thus configured therein.

Next, a concrete example of a configuration of the second aggregate table 55 will be explained with reference to FIG. 5B. A record in the second aggregate table 55 is configured with the advertiser ID for identifying the advertiser, the consumer ID for identifying the user of the printing device 10, the consumable supply point representing the used amount of the consumable supply, the condition ID used when judging whether the record is valid or not, and the condition flag representing whether the record is valid or not. The second aggregate table 55 is configured capable of registering two or more records thus configured therein.

Next, a concrete example of a configuration of the coefficient table 56 will be explained with reference to FIG. 5C. A record of the coefficient table 56 is configured with the paper type representing the type of the printing paper, and the coefficient corresponding to the paper type. The coefficient table 56 is configured capable of registering two or more records thus configured therein.

Explanations of Operations

Next, various kinds of processes to be executed in the printing device 10, aggregating server 30, application server 40, and advertiser server 50 will be explained.

(1) Printing Device Process

Firstly, a printing device process to be executed in the control portion 11 of the printing device 10 will be described with reference to a flowchart shown in FIG. 6. It is noted that the printing device process is a process to be started when an electrical power is supplied to the printing device 10.

When having started to execute the printing device process, firstly, the control portion 11 of the printing device 10 receives a command from the user (S103). Here, the command represents an instruction inputted in response to the operating portion 18 being operated by the user.

Subsequently, it is judged whether the command received in step S103 is a command that represents acquisition of the contents (S105). When it is judged that the command received in step S103 is a command that represents acquisition of the contents as a result of step S105 (S105: Yes), the process goes to step S113. Meanwhile, When it is not judged that the command received in step S103 is a command that represents acquisition of the contents as a result of step S105 (S105: No), the process goes to step S107.

In step S113, a contents obtaining process is executed. The contents obtaining process will be explained in detail later. After completing the contents obtaining process, it is judged whether the contents obtaining process has normally been terminated (S115). When it is judged that the contents obtaining process has normally been terminated (S115: Yes), the process goes to step S117. Meanwhile, when it is not judged whether the contents obtaining process has normally been terminated (S115: No), the process goes to step S119.

In step S117, a print aggregating process is executed. The print aggregating process will be explained in detail later. After completing the print aggregating process, the process goes back to the aforementioned step S103.

On the other hand, in step S119, information that an error occurs is displayed on the display portion 19, and thereafter, the process goes back to the aforementioned step S103. In step S107, it is judged whether the command accepted in step S103 is a command that represents transmission of a manuscript. When it is judged that the command accepted in step S103 is a command that represents transmission of a manuscript (S107: Yes), the process goes to step S121. Meanwhile, when it is not judged that the command accepted in step S103 is a command that represents transmission of a manuscript (S107: No), the process goes to step S109.

In step S121, an ordering process is executed. The ordering process will be explained in detail later. After completing the ordering process, the process goes back to the aforementioned step S1103.

In step S109, it is judged whether the command accepted in step S103 is a command that represents setting of the advertisement printing mode. When it is judged that the command accepted in step S103 is a command that represents setting of the advertisement printing mode (S109: Yes), the process goes to step S123. Meanwhile, when it is not judged that the command accepted in step S103 is a command that represents setting of the advertisement printing mode (S109: No), the process goes to step S111.

In step S123, an advertisement print setting process is executed. The advertisement print setting process will be explained in detail later. After completing the advertisement print setting process, the process goes back to the aforementioned step S103.

In step S111, other processes corresponding to commands are executed. It is noted that the "other processes" described here includes a process for actualizing a telephone function, a process for actualizing a scanner function, and a process for actualizing a copy machine function. As such processes are widely known, explanation thereof will be omitted. It is noted that the process goes back to the aforementioned step S103 after completing such processes.

(2) Contents Obtaining Process

Next, the contents obtaining process to be executed by the control portion 11 of the printing device 10 will be explained with reference to a flowchart shown in FIG. 7. It is noted that the contents obtaining process is a process to be started in response to being called for in step S113 of the aforementioned printing device process.

When starting to execute the contents obtaining process, firstly, the control portion 11 of the printing device 10 receives a URL of a source site of the contents data in response to the operating portion 18 being operated by the user (S153). It is noted that one of ways to receive the URL may be a way in which the URL is directly inputted by the user through the operating portion 18, or a way in which the URL is designated by the user among URL candidates displayed on the display portion 19.

When the URL has been received from the user, the control portion 11 of the printing device 10 requests the contents data of the application server 40 represented by the URL (S155). Subsequently, the control portion 11 of the printing device 10 receives the contents data as requested from the application server 40, and makes a temporary memory area (not shown) of the storing portion 20 store the received contents data (S157). Thereafter, the process is terminated, and a step following the step S113 as a calling source of the process in the printing device process is executed.

(3) Print Aggregating Process

Next, the print aggregating process to be executed by the control portion 11 of the printing device 10 will be explained with reference to a flowchart shown in FIG. 8. It is noted that the print aggregating process is a process to be started in response to being called for in step S1117 of the aforementioned printing device process.

When the print aggregating process has been started, the control portion 11 of the printing device 10 firstly clears the printing data storing area 21 (S203), and subsequently clears the aggregated data storing area 22 (S205). Then, the control portion 11 of the printing device 10 reads out one of unprocessed partial data from the contents data stored in the temporary memory area of the storing portion 20, and stores it in a RAM (not shown) of the control portion 11 (S207). It is noted that the "unprocessed data" described here represent data for which the below-mentioned process in step S209, i.e., a print pixel generating process is to be executed. It is noted that when a page break tag representing page break is inserted just behind the unprocessed partial data, the page break tag is read out as data included in the unprocessed partial data.

Subsequently, the print pixel generating process is executed (S209). The print pixel generating process will be explained in detail later. After completing the print pixel generating process, the process goes to step S211. In step S211, it is judged whether all of the partial data constituting the contents data stored in the temporary memory area of the storing portion 20 are processed. When it is judged that all of the partial data constituting the contents data are processed (S211: Yes), the process goes to step S213. Meanwhile, when it is not judged that all of the partial data constituting the contents data are processed (S211: No), the process goes back to the aforementioned step S213.

In step S213, a printing process is executed. The printing process will be explained in detail later. After completing the printing process, the process goes to step S215.

In step S215, it is judged whether the aggregated data are stored in the aggregated data storing area 22. The above aggregated data will be described later. In step S215, when it is judged that the aggregated data are stored in the aggregated data storing area 22 (S215: Yes), the process goes to step S217. In the meantime, when it is not judged that the aggregated data are stored in the aggregated data storing area 22 (S215: No), the process is terminated, and a step following the step S117 as a calling source of the process in the printing process is executed.

In step S217, an aggregated data sending process is executed. The aggregated data sending process will be described in detail later. After completing the aggregated data sending process, the process (print aggregating process) is terminated, and a step following the step S117 as a calling source of the process in the printing process is executed.

(4) Print Pixel Generating Process

Next, the print pixel generating process to be executed by the control portion 11 of the printing device 10 will be explained with reference to a flowchart shown in FIG. 9. It is noted that the print pixel generating process is a process to be started in response to being called for in step S209 of the aforementioned print aggregating process.

When having started to execute the print pixel generating process, the control portion 11 of the printing device 10 firstly reads out title data (a <title> tag and data defined by the <title> tag) from the contents data stored in the temporary memory area of the storing portion 20. Then, the control portion 11 of the printing device 10 writes the title data into the printing data storing area 21 (S253). It is noted that this step S253 is executed only once for the same contents data.

Subsequently, it is judged whether a printing data type (data defined as type=""in a <printing data> tag) in the partial data stored in the RAM of the control portion 11 is a character string "URL" (S255). When it is judged that the printing data type is the character string "URL" (S255: Yes) in consequence, the process goes to step S257. Meanwhile, when it is not judged that the printing data type is the character string "URL" (S255: No), the process goes to step S265.

In step S257, the printing data whose location is indicated by a URL described in a place defined by a printing data tag (a place defined by the <printing data> tag and a </printing data> tag) are obtained from a corresponding application server 40, and is stored in the RAM of the control portion 11 (S257). Then, the process goes to step S265.

In step S265, it is judged whether "type" data, included in the partial data tag (<partial data>) in the partial data stored in the RAM of the control portion 11, is a character string "advertisement". When it is judged that the "type" data included in the partial data tag (<partial data>) is the character string "advertisement" (S265: Yes) in consequence, the process goes to step S267. Meanwhile, when it is not judged that the "type" data included in the partial data tag (<partial data>) is the character string "advertisement" (S265: No), the process goes to step S269.

In step S267, an advertiser ID (data defined by an <advertiser ID> tag and an </advertiser ID> tag), an advertiser URL (data defined by an <advertiser URL> tag and an <advertiser URL tag>), and a condition ID (data defined by a <condition ID> tag and a </condition> tag) are selected from the partial data stored in the RAM, and are stored in the printing data storing area 21, respectively. It is noted that, when there is no data corresponding to the advertiser URL and condition ID in the partial data stored in the RAM of the control portion 11, "NULL" data are stored in a corresponding area of the printing data storing area 21. Thereafter, the process goes to step S271.

In step S269, the advertiser ID, advertiser URL, condition ID are stored as the "NULL" data into the printing data storing area 21, respectively. Thereafter, the process goes to step S271.

In step S271, each of data "type", "coordinate x", "coordinate y", "lateral width", and "longitudinal length", which are included in the partial data tag (<partial data>) in the partial data stored in the RAM of the control portion 11, is stored into the printing data storing area 21.

In a following step S273, the printing data (printing data obtained in step S257, or the printing data defined by the printing data tag of the partial data on the RAM) stored in the RAM of the control portion II are converted into pixel data that conform to the "lateral width" and "longitudinal length" included in the partial data tag (<partial data>) in the partial data stored in the RAM of the control portion 11, and are then stored into the printing data storing area 21.

In a following step S275, the size of the pixel data converted in step S273 is calculated, and is stored into the printing data storing area 21. In a following step S277, when the page break tag is included in the partial data stored in the RAM of the control portion 11, a page break command is stored into the printing data storing area 21. Thereafter, the process (print pixel generating process) is terminated, a step following the step S209 as a calling source of the process in the print aggregating process is executed.

Here, an aspect of data stored in the printing data storing area 21 as a result of the print pixel generating process will be explained with reference to a data configuration shown in FIG. 10. By the print pixel generating process being executed, there are written into the printing data storing area 21, as shown in FIG. 10, the "title" (data written in step S253), "type" (data written in step S271), "advertiser ID", "advertiser URL", "condition ID", (data written in step S267), "coordinate x", "coordinate y", "lateral width", "longitudinal length" (data written in step S271), "pixel data size" (data written in step S257), "pixel data" (data written in step S273), and "page break command" (data written in step S277). It is noted that the "type" to the "pixel data" are treated as one data block in the following explanation. In addition, a data block following the bottom of the page break command in FIG. 10 has been written in another print pixel generating process as subsequently executed.

(5) Printing Process

Next, the printing process to be executed by the control portion 11 of the printing device 10 will be explained with reference to a flowchart shown in FIGS. 11 and 12. It is noted that the printing process is a process to be started in response to being called for in step S213 of the aforementioned print aggregated process.

When having started to execute the printing process, the control portion 11 of the printing device 10 firstly sets a page counter provided in the RAM of the control portion 11 to be zero (S303 in FIG. 11). Subsequently, the paper type detected by a paper sensor (not shown) provided in the scanning portion 12 is stored in the paper type storing area 24 (S305). The "paper type" is represented by a paper size, paper thickness, paper material, etc.

Subsequently, it is judged whether a stop command is issued by the user (S307). More specifically, it is judged whether an instruction representing a stop of the process is inputted by the operating portion 18 being operated by the user. When it is judged that the stop command is issued by the user (S307: Yes) in consequence, the process (printing process) is terminated, and a step following the step S213 as a calling source of the process in the print aggregating process is executed.

On the other hand, when it is not judged that the stop command is issued by the user (S307: No), a unprocessed data block in the printing data storing area 21 is selected, and the "type" is read out (S309).

Subsequently, it is judged whether the "type" as read out in step S309 is the "advertisement" (S311). When it is judged that the "type" as read out in step S309 is the "advertisement" (S311: Yes) in consequence, the process goes to step S313. Meanwhile, when it is not judged whether the "type" as read out in step S309 is the "advertisement" (S311: No), the process goes to step S317.

In step S313, an advertisement print judging process is executed. The advertisement print judging process will be described in detail later. After completing the advertisement print judging process, the process goes to step S315.

In step S315, it is judged whether to execute advertisement printing based on a value of the below-mentioned advertisement printing execution flag (a flag provided in the RAM of the control portion 1). More specifically, when the advertisement printing execution flag is equals to one, it is judged that the advertisement printing is to be executed (S315: Yes), and the process goes to step S317. In the meantime, when the advertisement printing execution flag is equals to zero, it is not judged that the advertisement printing is to be executed (S315: No), and the process goes back to the aforementioned step S307.

In step S317, the pixel data size and the pixel data are read out from the data block being currently selected in the printing data storing area 21. Subsequently, the image is being printed by the recording portion 13 based on the pixel data until the page break is necessary (S319).

Next, it is judged whether what has been printed is an advertisement (S321). More specifically, when the "type" read out in step S309 is the "advertisement", it is judged that what has been printed in step S319 is an advertisement (S321: Yes). Meanwhile, when the "type" read out in step S309 is not an advertisement, it is not judged that what has been printed in step S319 is an advertisement (S321: No), the process goes to step S325 in FIG. 12.

In step S323, an aggregating process is executed. The aggregating process will be explained in detail later. After completing the aggregating process, the process goes to step S325 in FIG. 12.

In step S325 of FIG. 12, it is judged whether the page break is necessary. More specifically, even though the image has completely been printed before the page break is necessary in an operation of printing the image based on the pixel data in step S319, it is judged that the page break is necessary when the page break command exists immediately following the data block being currently selected in the printing data storing area 21 (S325: Yes). Further, it is judged that the page break is necessary, when the image has not completely been printed before the page break is necessary in the operation of printing the image based on the pixel data in step S319 (S325: Yes). On the other hand, when the image has completely been printed before the page break is necessary in the operation of printing the image based on the pixel data in step S319, and the page break command does not exist immediately following the data block being currently selected in the printing data storing area 21, it is not judged that the page break is necessary (S325: No).

In step S327, the page counter provided in the RAM of the control portion 11 is incremented by one. Then, the paper type detected by the paper sensor (not shown) provided in the scanning portion 12 is stored in the paper type storing area 24 (S329).

Subsequently, it is judged whether the image has completely been printed in the operation of printing the image based on the pixel data in step S319. When it is not judged that the image has completely been printed (S331: No), the process goes back to the aforementioned step S319. Meanwhile, when it is judged whether the image has completely been printed (S331: Yes), the process goes to step S333.

In step S333, it is judged whether all of the data blocks included in the printing data storing area 21 are processed. When it is judged that all of the data blocks included in the printing data storing area 21 are processed (S333: Yes), the process (printing process) is terminated, and a step following the step S213 as a calling source of the process in the print aggregating process is executed. Meanwhile, when it is not judged that all of the data blocks included in the printing data storing area 21 are processed (S333: No), the process goes back to the aforementioned step S307.

(6) Advertisement Print Judging Process

Next, the advertisement print judging process to be executed by the control portion 11 of the printing device 10 will be explained with reference to a flowchart shown in FIG. 13. It is noted that the advertisement print judging process is started in response to being called for in step S313 of the aforementioned printing process.

When having started to execute the advertisement print judging process, firstly, the control portion 11 of the printing device 10 judges whether the advertisement printing mode stored in the advertisement printing mode storing area 23 of the storing portion 20 is a mode "complete printing" (S353). When it is judged that the advertisement printing mode stored in the advertisement printing mode storing area 23 is the mode "complete printing" (S353: Yes), the process goes to step S361. Meanwhile, when it is not judged that the advertisement printing mode stored in the advertisement printing mode storing area 23 is the mode "complete printing" (S353: No), the process goes to step S355.

In step S355, it is judged whether the advertisement printing mode stored in the advertisement printing mode storing area 23 is a mode "rejection of printing on second page and rest". When it is judged that the advertisement printing mode stored in the advertisement printing mode storing area 23 is the mode "rejection of printing on second page and rest" (S355: Yes), the process goes to step S359. Meanwhile, when it is not judged that the advertisement printing mode stored in the advertisement printing mode storing area 23 is the mode "rejection of printing on second page and rest" (S355: No), the process goes to step S357.

In step S357, the advertisement printing execution flag provided in the RAM of the control portion 11 is set to be "0". Then, the process (advertisement print judging process) is terminated, and a step following the step S313 as a calling source of the process in the printing process is executed.

In step S359, it is judged whether a current value of the page counter (counter provided in the RAM of the control portion 11) is "1". When it is judged that the current value of the page counter is "1" (S359: Yes), the process goes to step S361. In the meantime, when it is judged that the current value of the page counter is "0" (S359: No), the process goes to the aforementioned step S357.

In step S361, the advertisement printing execution flag provided in the RAM of the control portion 11 is set to be "1". Then, the process (advertisement print judging process) is terminated, and a step following the step S313 as a calling source of the process in the printing process is executed.

(7) Aggregating Process

Next, the aggregating process to be executed by the control portion 11 of the printing device 10 will be explained with reference to a flowchart shown in FIG. 14. It is noted that the aggregating process is started in response to being called for in step S323 of the aforementioned printing process.

When stating to execute the aggregating process, firstly, the control portion 11 of the printing device 10 calculates a printed amount in a previous printing operation (S403). It is noted that the "printed amount" is defined as an area of a printed region in the previous printing operation ("lateral width"×"longitudinal length") divided by an area of the printing paper.

Subsequently, the paper type is read out from the paper type storing area 24 (S405). Then, the aggregated data with the same page, same advertiser, same advertiser URL, same condition ID, and same paper type as the partial data printed in the previous printing operation are searched in the aggregated data storing area 22 (S407).

Here, concrete examples of the aggregated data will be explained with reference to aggregated data samples shown in FIGS. 15A and 15B. FIG. 15A is a sample of the aggregated data in the case where the advertiser URL and condition ID are included therein. As shown in the sample, the aggregated data are described in an XML (extensible markup language). In the aggregated data, there are defined by tags a "page number" that is information representing a page number of which an object to be aggregated is included on pages, "consumer ID" that is identification information that enables to identify the user of the printing device 10, "advertiser ID" that is identification information that enables to identify the advertiser, "advertiser URL" that indicates a destination URL of a web site administrated by the advertiser, "condition ID" that is used when the aggregating server 30 judges whether the aggregated data is valid, "paper type" that represents the type of the printing paper, "number of pages" that represents the number of pages printed for the target to be aggregated, and "printing type" that represents the type of an image-forming material such as ink and toner used for printing. It is noted that the "advertiser URL" and "condition ID" are not defined in some partial data in the advertisement (see FIG. 15B).

Referring to FIG. 14 again, in the next step S409, it is judged whether corresponding aggregated data are found in the searching operation in step S407. When it is judged that the corresponding aggregated data are found (S409: Yes), the process goes to step S419. Meanwhile, when it is not judged whether the corresponding aggregated data are found (S409: No), the process goes to step S411.

In S411, new aggregated data (XML) are generated in the aggregated data storing area 22 to set a page number, consumer ID, and printing type. The page number represents a page number of a page on which the partial data have been printed in the previous printing operation. In addition, the consumer ID is identification information that enables to substantially identify the user of the printing device 10. For example, a serial number of the printing device 10 corresponds to the consumer ID. Further, the printing type is the type of the image-forming material such as ink and toner used when the recording portion 13 has performed a printing operation.

In a subsequent step S413, the advertiser ID, advertiser URL, condition ID are read out from the printing data storing area 21 to be set in the aggregated data that have been generated in step S411. In a subsequent step S415, the paper type is read out from the paper type storing area to be set in the aggregated data.

In a subsequent step S417, the printed amount (area of the printed region in the previous printing operation divided by the area of the printing paper) generated in step S403 is set in the aggregated data generated in step S411. Then, the process (aggregating process) is terminated, and a step following the step S323 as a calling source of the process in the printing process is executed.

On the other hand, in step S419, to the value "number of pages" of the found aggregated data, the printed amount (area of the printed region in the previous printing operation divided by the area of the printing paper) generated in step S403 is added. Then, the process (aggregating process) is terminated, and a step following the step S323 as a calling source of the process in the printing process is executed.

(8) Aggregated Data Sending Process

Next, the aggregated data sending process to be executed by the control portion 11 of the printing device 10 will be explained with reference to a flowchart shown in FIG. 16. It is noted that the aggregated data sending process is a process to be started in response to being called for in step S217 of the aforementioned print aggregating process.

When having started to execute the aggregated data sending process, firstly, the control portion 11 of the printing device 10 reads out one of unprocessed aggregated data from the aggregated data storing area 22, and loads it in the RAM of the control portion 11 (S451). It is noted that the "unprocessed aggregated data" described here are aggregated data that have not yet been read out among the aggregated data stored in the aggregated data storing area 22.

In a subsequent step S453, aggregated data having the same "advertiser", the same "advertiser URL", the same "condition ID", the same "paper type", and the same "printing type" as the aggregated data read out in step S451 are searched from the aggregated data storing area 22.

In a subsequent step S455, it is judged whether at least one aggregated data corresponding to the above conditions is found. When it is judged that at least one aggregated data corresponding to the above conditions is found (S453: Yes), the process goes to step S457. Meanwhile, when it is not judged that at least one aggregated data corresponding to the above conditions is found (S453: No), the process goes to step S463.

In step S457, the value "number of pages" in the aggregated data read out in step S451 and the values "number of pages" in all of the aggregated data found in the searching operation in step S453 are summed, and the summation is set in the aggregated data loaded in the RAM.

In a subsequent step S459, the "page number" is deleted together with the tag from the aggregated data loaded in the RAM. In a subsequent step S461, all of the aggregated data found in the searching operation in step S453 are deleted.

In a subsequent step S463, the aggregated data loaded in the RAM are sent to the aggregating server 30 via the communication portion 16. In a subsequent step S465, it is judged whether the valid "advertiser URL" is included in the aggregated data loaded in the RAM. When it is judged that the valid "advertiser URL" is included (S465: Yes), the process goes to step S467. Meanwhile, when it is not judged that the valid "advertiser URL" is included (S465: No), the process goes to step S469.

In step S467, the aggregated data loaded in the RAM are sent to the advertiser server 50 indicated by the valid advertiser URL via the communication portion 16. Then, the process goes to step S469.

In step S469, it is judged whether the unprocessed aggregated data are included in the aggregated data stored in the aggregated data storing area 22. When it is judged that the unprocessed aggregated data are included (S469: Yes), the process goes to the aforementioned step S451. Meanwhile, when it is not judged that the unprocessed aggregated data are included (S469: No), the process (aggregated data sending process) is terminated, and a step following the step S217 as a calling source of the process in the print aggregating process is executed.

(9) Ordering Process

Next, the ordering process to be executed by the control portion 11 of the printing device 10 will be explained with reference to a flowchart shown in FIG. 17. It is noted that the ordering process is a process to be started in response to being called for in step S121 of the aforementioned printing device process.

When having started to execute the ordering process, firstly, the control portion 11 of the printing device 10 receives a URL for receiving an ordering service (S503). It is noted that the control portion 11 may receive the URL with the URL being directly inputted by the user through the operating portion 18, or with the URL being specified from the URL candidates displayed on the display portion 19.

In a subsequent step S505, an instruction for inducing the user to set a manuscript to be scanned is displayed on the display portion 19. In a subsequent step S507, the user is inquired about whether the setting of the manuscript to be scanned has been completed. More specifically, the above operation is actualized by displaying a message as "If you complete manuscript setting, please press an execution button." on the display portion 19, and monitoring whether the execution button of the operating portion 18 is pressed. It is noted that the step S507 is repeated until the execution button of the operating portion 18 is pressed.

In a subsequent step S509, the manuscript to be scanned is scanned by the scanning portion 12, and the image data obtained by scanning the manuscript are loaded in the RAM. In a subsequent step S511, ordering data are generated with the consumer ID (information that enables to substantially identify the user of the printing device 10 such as a serial number of the printing device) and the image data.

In a subsequent step S513, the ordering data generated in step S511 are sent to the application server 40 indicated by the URL received in step S503 via the communication portion 16. In a subsequent step S515, response data to the ordering data sent in step S513 are received from the application server 40 via the communication portion 16.

In a subsequent step S517, it is judged whether the response data received in step S515 represents an error. When it is judged that the response data received in step S515 represents an error (S517: Yes), the process goes to step S521. Meanwhile, when it is not judged that the response data received in step S515 represents an error (S517: No), the process goes to step S519.

In step S519, information that the order has normally been completed is displayed on the display portion 19, and the process is terminated. Then, a step following the step S121 as a calling source of the process in the printing device process is executed.

On the other hand, in step S521, information that the order has not normally been completed is displayed on the display portion 19, and the process (ordering process) is terminated. Then, the step following the step S121 as the calling source of the process in the printing device process is executed.

(10) Advertisement Print Setting Process

Next, the advertisement print setting process to be executed by the control portion 11 of the printing device 10 will be explained with reference to a flowchart shown in FIG. 18. It is noted that the advertisement print setting process is a process to be started in response to being called for in step S123 of the aforementioned printing device process.

When having started to execute the advertisement print setting process, firstly, the control portion 11 of the printing device 10 displays a screen image for setting advertisement printing mode on the display portion 19 (S553). More specifically, the above operation is actualized by displaying a message "please input an advertisement printing mode you wish. 1: print all, 2: not print, 3: print only first page" on the display portion 19, and monitoring which number button is pressed.

Subsequently, the process is branched depending on the kind of the number button pressed by the user (S555, S557, and S559). When a number button pressed by the user is a button "1", or when it is judged that the user wishes to print all of the advertisement, the process goes to step S561. In addition, when a number button pressed by the user is a button "2", or when it is judged that the user rejects to print the advertisement at all, the process goes to step S563. Further, when a number button pressed by the user is a button "3", or when it is judged that the user wishes to print a first page of the advertisement, the process goes to step S565.

In step S561, an advertisement printing mode "complete printing" is set in the advertisement printing mode storing area 23. Then, the process (advertisement print setting process) is terminated, and a step following the step S123 as a calling source of the process in the printing device process is executed. In step S563, an advertisement printing mode "rejection" is set in the advertisement printing mode storing area 23. Then, the process (advertisement print setting process) is terminated, and a step following the step S123 as a calling source of the process in the printing device process is executed. In step S565, an advertisement printing mode "rejection of printing on second page and rest" is set in the advertisement printing mode storing area 23. Then, the process (advertisement print setting process) is terminated, and a step following the step S123 as a calling source of the process in the printing device process is executed.

(11) Application Server Process

Next, the application server process to be executed by the control portion 41 of the application server 40 will be explained with reference to a flowchart shown in FIG. 19. It is noted that the application server process is a process to be started when an electrical power has started to be supplied to the application server 40.

When having started to execute the application server process, the control portion 41 of the application server 40 judges whether a data request has been issued from the printing device 10 (S603). It is noted that the "data request" described here is a request to be issued in step S155 of the contents obtaining process to be executed by the printing device 10. When it is judged that the data request has been issued from the printing device 10 (S603: Yes), the contents data sending process is executed (S607), and the process goes back to step S603 after completing the contents data sending process. It is noted that the contents data sending process will be described in detail later.

On the other hand, when it is not judged that the data request has been issued from the printing device 10 (S603: No), it is judged whether an order request has been issued from the printing device 10 (S605). It is noted that the "order request" described here corresponds to the ordering data to be sent in step S513 of the ordering process to be executed by the printing device 10. When it is judged that the order request has been issued from the printing device 10 (S605: Yes), the ordering data receiving process is executed (S609), and the process goes back to step S603 after completing the ordering data receiving process. It is noted that the ordering data receiving process will be described in detail later.

In the meantime, when it is not judged that the order request has been issued from the printing device 10 (S605: No), the process goes back to step S603.

(12) Contents Data Sending Process

Next, the contents data sending process to be executed by the control portion 41 of the application server 40 will be explained with reference to a flowchart shown in FIG. 20. It is noted that the contents data sending process is a process to be started in response to being called for in step S607 of the aforementioned application server process.

When having started to execute the contents data sending process, firstly, the control portion 41 of the application server 40 searches contents data corresponding to a query of a URL from the contents DB 44 (S653).

In a subsequent step S655, it is judged whether the corresponding contents data have been found in the searching operation of step S653. When it is judged that the corresponding contents data have been found in the searching operation of step S653 (S655: Yes), the process goes to step S657. Meanwhile, when it is not judged that the corresponding contents data have been found in the searching operation of step S653 (S655: No), the process goes to step S663.

In step S657, the advertiser ID is read out from the unprocessed partial data including the advertiser ID in the found contents data, and the advertiser URL is inserted into the found contents data with reference to the advertiser table 45.

In a subsequent step S659, it is judged whether the step S657 has been executed for all of the partial data included in the contents data found in the searching operation of step S653. When it is judged that the step S657 has been executed for all of the partial data (S659: Yes), the process goes to step S661. Meanwhile, when it is not judged that the step S657 has been executed for all of the partial data (S659: No), the process goes back to step S657.

In step S661, the contents data, which have been found in step S653 and the advertiser URL has been inserted into in step S657, are sent to the printing device 10 as a requesting source via the communication portion 42. Then, the process (contents data sending process) is terminated, and a step following the step S607 as a calling source of the process in the application server process is executed.

In step S663, error data representing that the corresponding contents data have not been found are sent to the printing device 10 as the requesting source via the communication portion 42. Then, the process (contents data sending process) is terminated, and the step following the step S607 as the calling source of the process in the application server process is executed.

(13) Ordering Data Receiving Process

Next, the ordering data receiving process to be executed by the control portion 41 of the application server 40 will be explained with reference to a flowchart shown in FIG. 21. It is noted that the ordering data receiving process is a process to be started in response to being called for in step S609 of the aforementioned application server process.

When having started to execute the ordering data receiving process, firstly, the control portion 41 of the application server 40 extracts the consumer ID included in the ordering data sent from the printing device 10 (S703).

In a subsequent step S705, the control portion 41 of the application server 40 recognizes the advertiser ID and condition ID from the image data included in the ordering data with a character recognition technology, and stores the recognized advertiser ID and condition ID in the RAM of the control portion 41. In a subsequent step S707, it is judged whether the image data included in the ordering data is a legitimate application form. More specifically, a form code (see FIG. 4B) is extracted from the image data included in the ordering data, and it is judged whether the image data is the legitimate application form by checking whether the extracted form code is proper. It is noted that, in the illustrative aspect, a proper application form code is given at a predetermined position on each of the legitimate application forms. In this judgment, when it is judged that the image data included in the ordering data is the legitimate application form (S707: Yes), the process goes to step S709. Meanwhile, when it is not judged that the image data included in the ordering data is the legitimate application form (S707: No), the process goes to step S721.

In step S709, from the image data included in the ordering data, information necessary for an order (such as a product name, the number of the products, and a destination where the products are to be sent) is recognized depending on the kind of the form, and the recognized information is stored in a predetermined area of the storing portion 43.

In a subsequent step S711, it is judged whether the advertiser ID and condition ID are recognized in step S705. When it is judged that the advertiser ID and condition ID are recognized (S711: Yes), the process goes to step S713. Meanwhile, when it is not judged that the advertiser ID and condition ID are recognized (S711: No), the process goes to step S719.

In step S713, a command representing that the conditions are satisfied, and the recognized advertiser ID and condition ID are sent to the aggregating server 30 via the communication portion 42.

In a subsequent step S715, it is judged whether the advertiser ID recognized in step S705 exists in the advertiser table 45, and whether the advertiser URL corresponding to the advertiser ID recognized is registered in the advertiser table 45. When it is judged that the advertiser ID recognized in step S705 exists in the advertiser table 45, and the advertiser URL corresponding to the advertiser ID recognized is registered in the advertiser table 45 (S715: Yes), the process goes to step S717. Meanwhile, when it is not judged that the advertiser ID recognized in step S705 exists in the advertiser table 45, or it is not judged that the advertiser URL corresponding to the advertiser ID recognized is registered in the advertiser table 45 (S715: No), the process goes to step S719.

In step S717, a command representing that the conditions are satisfied, and the recognized advertiser ID and condition ID are sent to the advertiser server 50 indicated by the advertiser URL registered in the advertiser table 45 via the communication portion 42. Then, the process goes to step S719.

In step S719, information representing that the order has normally been processed is sent to the printing device as a requesting source via the communication portion 42. Then, the process (ordering data receiving process) is terminated, and a step following the step S609 as a calling source of the process in the application server process is executed.

On the other hand, in step S721, information representing that the order has not normally been processed is sent to the printing device as the requesting source via the communication portion 42. Then, the process (ordering data receiving process) is terminated, and the step following the step S609 as the calling source of the process in the application server process is executed.

(14) Aggregating Server Process

Next, the aggregating server process to be executed by the control portion 31 of the aggregating server 30 will be explained with reference to a flowchart shown in FIG. 22. It is noted that the aggregating server process is a process to be started when an electrical power has started to be supplied to the aggregating server 30.

When having started to execute the aggregating server process, firstly, the control portion 31 of the aggregating server 30 judges whether present time is predetermined aggregating time based on a built-in clock (S753). When it is judged that the present time is the predetermined aggregating time based on the built-in clock (S753: Yes), the process goes to step S759. Meanwhile, when it is not judged that the present time is the predetermined aggregating time based on the built-in clock (S753: No), the process goes to step S755.

In step S759, an aggregated data delivering process is executed. It is noted that the aggregated data delivering process will be described in detail later. After completing the aggregated data delivering process, the process goes back to the aforementioned step S753.

On the other hand, in step S755, it is judged whether the aggregated data have been received. It is noted that the "aggregated data" described here are aggregated data to be sent in step S463 of the aggregated data sending process to be executed by the printing device 10. In step S755, when it is judged that the aggregated data have been received (S755: Yes), the process goes to step S761. Meanwhile, when it is not judged that the aggregated data have been received (S755: No), the process goes to step S757.

In step S761, an aggregate table storing process is executed. It is noted that the aggregate table storing process will be described in detail later. After completing the aggregate table storing process, the process goes to the aforementioned step S753.

On the other hand, in step S757, it is judged whether a condition-satisfied command has been received. It is noted that the "condition-satisfied command" described here is a command to be sent in step S713 of the ordering data receiving process to be executed by the application server 40. When it is judged that the condition-satisfied command has been received (S757: Yes), the process goes to step S763. Meanwhile, when it is not judged that the condition-satisfied command has been received (S757: No), the process goes back to the aforementioned step S753.

In step S763, a record in the aggregate table 35 corresponding to the condition ID sent together with the condition-satisfied command is searched, and a condition flag of the record found is set to be "1". Then, the process goes back to the aforementioned step S753.

(15) Aggregated Data Delivering Process

Next, the aggregated data delivering process to be executed by the control portion 31 of the aggregating server 30 will be explained with reference to a flowchart shown in FIG. 23. It is noted that the aggregated data delivering process is a process to be started in response to being called for in step S759 of the aforementioned aggregating server process.

When having started to execute the aggregated data delivering process, firstly, the control portion 31 of the aggregating server 30 refers to the advertiser table 34 to select one of unprocessed advertiser IDs (S803). It is noted that the "unprocessed advertiser ID" described here represents an advertiser ID for which the below-mentioned steps of S805 to S809 have not been executed.

In a subsequent step S805, aggregated data (records), corresponding to the advertiser ID selected in step S803, whose condition flags are "1" are extracted from the aggregate table 35 and loaded into the RAM of the control portion 31.

In a subsequent step S807, an e-mail address corresponding to the advertiser ID selected in step S803 is read out from the advertiser table 34. In a subsequent step S809, the aggregated data loaded into the RAM in step S805 are sent to a destination indicated by the e-mail address read out in step S807 via the communication portion 32.

In a subsequent step S811, it is judged whether the steps of S805 to S809 have been executed for all of the advertiser IDs existing in the advertiser table 34. When it is judged that the steps of S805 to S809 have been executed for all of the advertiser IDs (S811: Yes), the process (aggregated data delivering process) is terminated. Then, a step following the step S759 as a calling source of the process in the aggregating server process is executed.

On the other hand, when it is not judged that the steps of S805 to S809 have been executed for all of the advertiser IDs (S811: No), the process goes back to the aforementioned step S803.

(16) Aggregate Table Storing Process

Next, the aggregate table storing process to be executed by the control portion 31 of the aggregating server 30 will be explained with reference to a flowchart shown in FIG. 24. It is noted that the aggregate table storing process is a process to be started in response to being called for in step S761 of the aforementioned aggregating server process.

When having started to execute the aggregate table storing process, firstly, the control portion 31 of the aggregating server 30 adds a new vacant record to the aggregate table 35 (S853). In a subsequent step S855, corresponding fields of the record added in step S853 are updated with the advertiser ID and consumer ID of the aggregated data (aggregated data sent in step S463 of the aggregated data sending process executed by the printing device 10).

In a subsequent step S857, a coefficient corresponding to the paper type of the aggregated data is read out from the coefficient table. In a subsequent step S859, a point is obtained by multiplying the value of the number of pages of aggregated data by the coefficient read out in step S857. Then, a corresponding field (consumable supply point) of the record added in step S853 is updated with the obtained point.

In a subsequent step S861, it is judged whether the condition ID is included in the aggregated data. When it is judged that the condition ID is included in the aggregated data (S861: Yes), the process goes to step S863. Meanwhile, when it is not judged that the condition is included in the aggregated data (S861: No), the process goes to step S867.

In step S863, a corresponding field of the record added in step S853 is updated with the condition ID included in the aggregated data.

In a subsequent step S865, the condition flag of the record added in step S853 is updated to be "0". Then, the process (aggregate table storing process) is terminated, and a step following the step S761 as a calling source of the process in the aggregating server process is executed.

On the other hand, in step S867, the condition flag of the record added in step S853 is updated to be "1". Then, the process (aggregate table storing process) is terminated, and the step following the step S761 as the calling source of the process in the aggregating server process is executed.

(17) Advertiser Server Process

Next, the advertiser server process to be executed by the control portion 51 of the advertiser server 50 will be explained with reference to a flowchart shown in FIG. 25. It is noted that the advertiser server process is a process to be started when an electrical power has started to be supplied to the advertiser server 50.

When having started to execute the advertiser server process, firstly, the control portion 51 of the advertiser server 50 judges whether the aggregated data have been received from the printing device 10 (S903). It is noted that the "aggregated data" described here are aggregated data to be sent in step S467 of the aggregated data sending process to be executed by the printing device 10. When it is judged that the aggregated data have been received from the printing device 10 (S903: Yes), the process goes to step S907. Meanwhile, when it is not judged that the aggregated data have been received from the printing device 10 (S903: No), the process goes to step S905.

In step S907, a first storing process is executed. It is noted that the first storing process will be described in detail later. After completing the first storing process, the process goes back to the aforementioned step S903.

On the other hand, in step S905, it is judged whether the aggregated data have been received from the aggregating server 30 (S905). It is noted that the "aggregated data" described here are aggregated data to be sent in step S809 of the aggregated data sending process to be executed by the aggregating server. When it is judged that the aggregated data have been received from the aggregating server 30 (S905: Yes), the process goes to step S909. Meanwhile, when it is not judged that the aggregated data have been received from the aggregating server 30 (S905: No), the process goes back to the aforementioned step S903.

In step S909, a second storing process is executed. It is noted that the second storing process will be described in detail later. After completing the second storing process, the process goes back to the aforementioned step S903.

(18) First Storing Process

Next, the first storing process to be executed by the control portion 51 of the advertiser server 50 will be explained with reference to a flowchart shown in FIG. 26. It is noted that the first storing process is a process to be started in response to being called for in step S907 of the aforementioned advertiser server process.

When having started to execute the first storing process, firstly, the control portion 51 of the advertiser server 50 adds a new vacant record to the first aggregate table (S931). In a subsequent step S933, corresponding fields of the record added in step S931 are updated with the advertiser ID and consumer ID in the aggregated data (the aggregated data sent in step S467 of the aggregated data sending process executed by the printing device 10), respectively.

In a subsequent step S935, a coefficient corresponding to the paper type of the aggregated data is read out from the coefficient table 56. In a subsequent step S937, a point is obtained by multiplying the value of the number of pages in the aggregated data by the coefficient read out in step S935, and a corresponding field (the consumable supply point) of the record added in step S931 is updated with the obtained point. Thereafter, the process (aggregate table storing process) is terminated. Then, a step following the step S907 as a calling source of the process in the aggregating server process is executed.

(19) Second Storing Process

Next, the second storing process to be executed by the control portion 51 of the advertiser server 50 will be explained with reference to a flowchart shown in FIG. 27. It is noted that the second storing process is a process to be started in response to being called for in step S909 of the aforementioned advertiser server process.

When having started to execute the second storing process, firstly, the control portion 51 of the advertiser server 50 adds a new vacant record to the second aggregate table 2 (S953). In a subsequent step S955, corresponding fields of the record added in step S931 are updated with the advertiser ID, consumer ID, and consumable supply point in the aggregated data (the aggregated data sent in step S809 of the aggregated data sending process executed by the printing device 10). The, the process (aggregate table storing process) is terminated, and a step following the step S909 as a calling source of the process in the aggregating server process is executed.

Effects of Illustrative Aspects

According to the contents-providing system 1 thus configured, the printed amount (the value of the area of the printed region ("lateral width"×"longitudinal length") divided by the area of the printing paper) of each of the advertisements is aggregated into the aggregating server 30, and the consumable supply point is determined. Further, the consumable supply point is sent to the server (advertiser server 50) of the provider of each of the advertisements. For this reason, the advertiser can indirectly grasp the printed amount of the advertisement. Accordingly, the provider can presume the effect brought by the advertisement being printed.

Further, the aforementioned contents-providing system 1 is configured such that, after the aggregating process (see FIG. 14) has been completed by the printing device 10, the aggregated data are sent to the aggregating server 30. Therefore, communication traffic of data to be sent to the aggregating server 30 from the printing device 10 can be reduced.

Further, the aforementioned contents-providing system 1 is configured to inquire of the user of the printing device 10 whether to print the advertisement (see FIG. 18). Thus, since the contents-providing system 1 is configured to reflect what the user of the printing device 10 wishes with respect to the advertisement printing, the printing device 10 is user-friendly.

Further, the aforementioned contents-providing system 1 is configured such that the aggregating server 30 sends the aggregated data to the advertiser server 50, and that the printing device 10 directly sends the aggregated data to the advertiser server 50 (see S467 in FIG. 16). Therefore, the advertiser can compare the aggregated data (data stored in the first aggregate table) sent directly to the server of itself (the advertiser server 50) from the printing device 10 with the aggregated data (data stored in the second aggregate table) sent to the server of itself (the advertiser server 50) from the aggregating server 30, so as to check whether the aggregated data are proper.

Further, the aforementioned contents-providing system 1 is configured such that the condition-satisfied command is sent to the aggregating server 30 when the advertiser ID and condition ID can be recognized in the ordering data process executed by the application server 40 (see S713 in FIG. 21). In response to the aggregating server 30 receiving the condition-satisfied command, corresponding aggregated data stored in the aggregating server 30 are valid (see S763 in FIG. 22). Therefore, only when the user makes application based on the application form previously printed, the aggregated data sent to the aggregating server 30 are valid. Namely, only when the specific condition (condition where the user makes application based on the application form previously printed is satisfied, the aggregated data sent to the aggregating server 30 can be treated as valid data.

Other Illustrative Aspects (1) According to the contents-providing system 1 in the aforementioned illustrative aspects, the advertisement included in the contents data sent to the printing device 10 from the application server 40 is not selected based on a category in which the advertisement is included. However, the advertisement may be selected in conformity to the user's taste. More specifically, the printing device 10 is previously configured to accept a category that user thereof wishes through the operating portion 18 and store the category accepted (for example, a screen image 71 as shown in FIG. 28 is displayed on the display portion 19 of the printing device 10, and a category that the user of the printing device 10 has inputted is stored in the storing portion 20). In addition, information on categories of the advertisement may be added to the contents data stored in the application server 40. When the printing device 10 prints the advertisement, it may be judged whether a category of the advertisement included in the contents data conforms to a category the user has selected, and the advertisement may be printed based on the judgment (for example, the above judging process may be inserted between the steps of S265 and S267 in the aforementioned print pixel generating process. In this case, only when the category of the advertisement included in the contents data conforms to the category the user has selected, a process of the step S267 and steps thereafter may be executed. Meanwhile, when the category of the advertisement included in the contents data does not conform to the category the user has selected, the print pixel generating process may be terminated).

Since the contents-providing system 1 thus configured enables the user of the printing device 10 to print only the advertisement in the category that the user wishes, wasteful consumption of the printing medium or image-forming material can be reduced, and concurrently, the effect of the advertisement can be enhanced.

In addition, a management server configured to manage categories favored by each of the users or in each of the printing devices 10 may separately provided, and favorite categories may previously be registered in the management server. In this case, the application server 40 may inquire the categories of the management server, and may insert advertisement information in a category suitable for the printing device 10 as a destination where the contents data are to be sent into the contents data, so as to send the contents data including the advertisement information to the printing device 10.

Since the contents-providing system 1 thus configured enables the user of the printing device 10 to print only the advertisement in the category that the user wishes, wasteful consumption of the printing medium or image-forming material can be reduced, and concurrently, the effect of the advertisement can be enhanced.

(2) According to the contents-providing system 1 in the aforementioned illustrative aspects, the coefficient table 36 provided in the aggregating server 30 and the coefficient table 56 provided in the advertiser server 50 are configured with the paper type representing the type of the printing paper and the coefficient corresponding to the respective paper type. However, the coefficient tables 36 and 56 may be configured as a coefficient table 36a (56a) shown in FIG. 29A. Namely, vertical items of the table represent the types of the image-forming materials, and horizontal items represent the kinds of colors. In this case, aggregated data generated by the printing device 10 may include the type of the image-forming material and the used amount of the image-forming material in each of the colors (see FIG. 29B).

Thereby, the advertiser can grasp the used amount of the image-forming material for printing the advertisement in more detail.

(3) According to the contents-providing system 1 in the aforementioned illustrative aspects, the printed amount (the area of the printed region ("lateral width"ב"longitudinal length") divided by the area of the printing paper) is calculated in the printing device 10 to be sent to the aggregating server 30. However, the contents-providing system 1 may be configured such that the printing device 10 does not calculate the printed amount, but sends information necessary for calculating the printed amount to the aggregating server 30. For example, the aggregated data may be aggregated data as shown in FIGS. 30A and 30B. Aggregated data shown in FIG. 30A include the lateral width and the longitudinal length of the printed region as the printed amount as well as coordinates of an upper left point of the printed region. Further, aggregated data shown in FIG. 30B include information of the area and position of the printed region.

Such aggregated data can bring the same effect as the contents-providing system 1 in the aforementioned illustrative aspects with the aggregating server 30 executing the aggregating process.

(4) According to the contents-providing system 1 in the aforementioned illustrative aspects, the effect of the advertisement is estimated using the printed amount (the area of the printed region ("lateral width"ב"longitudinal length") divided by the area of the printing paper) of the advertisement. However, the effect of the advertisement may be estimated using the following information.

a. Data Amount of Advertisement

A "data amount of advertisement" is, for example, the size of the pixel data (e.g., 30 Kbytes) calculated in step S275 of the aforementioned print pixel generating process. The contents-providing system 1 may be configured such that the printing device 10 sets such a "data amount of advertisement" in the aggregated data to be sent to the application server 40, and that the application server 40 aggregates the "data amount of advertisement".

b. Number of Printing Times of Advertisement

A "number of printing times of advertisement" is information about how many times a specific kind of advertisement is printed by the printing device 10. The contents-providing system 1 may be configured such that the printing device 10 sets such a "number of printing times of advertisement" in the aggregated data to be sent to the application server 40, and that the application server 40 aggregates the "numbers of printing times of advertisement".

c. Position of Printed Advertisement

A "position of printed advertisement" is information about where the advertisement is printed on the printing medium such as a printing paper, for example, including such information as an upper part or a lower part, and how many centimeters from the upper left corner of the printing paper in x-y coordinates (see FIG. 30B). The contents-providing system 1 may be configured such that the printing device 10 sets such information on the "position of printed advertisement" in the aggregated data to be sent to the application server 40, and that the application server 40 converts the information into numerical values corresponding to respective superiorities (in advertising effectiveness) of the positions of the printed advertisements to aggregate the converted numerical values.

d. Type of Printing Medium

A "type of printing medium" is information about the type of a printing medium used for printing of the advertisement, for example, including information about material of the printing medium such as a high-quality paper, recycled paper, and photo paper, and information about the size of the printing medium such as A5, B5, and letter-size. The contents-providing system 1 may be configured such that the printing device 10 sets such information on the "type of printing medium" in the aggregated data to be sent to the application server 40, and that the application server 40 converts the information into numerical values corresponding to respective values (in advertising effectiveness) of the printing mediums to aggregate the converted numerical values.

e. Used Amount of Image-Forming Material

A "used amount of image-forming material" is information about a used amount of image-forming material (e.g., ink and toner) used for printing of the advertisement, for example, including information about how many cc ink has been used in total (with no distinction among colors), how many micrograms (μg) toner of Cyan (C) has been used, and how many micrograms (μg) toner of Magenta (M) has been used. The contents-providing system 1 may be configured such that the printing device 10 sets such information on the "used amount of image-forming material" in the aggregated data to be sent to the application server 40, and that the application server 40 converts the information into numerical values corresponding to respective values or striking degrees (in advertising effectiveness) of the image-forming materials to aggregate the converted numerical values.

f. Time Period Taken for Printing of Advertisement

A "time period taken for printing of advertisement" is a time period taken for printing of the advertisement in the printing operation. The contents-providing system 1 may be configured such that the printing device 10 sets such a "time period taken for printing of advertisement" in the aggregated data to be sent to the application server 40, and that the application server 40 aggregates the "time periods taken for printing of advertisement".

(5) According to the contents-providing system 1 in the aforementioned illustrative aspects, the user of the printing device 10 can select any of the three modes, 1: print all, 2: not print, 3: print only first page (see FIG. 18). However, the contents-providing system 1 may be configured such that the user of the printing device 10 can arbitrarily specify pages on which the advertisement is to be printed. For example, the control portion 11 of the printing device 10 may display a message "Please input page numbers of pages on which you wish to print the advertisement." on the display portion 19, and may accept page numbers the user wishes by checking which number buttons of the operating portion 18 have been pressed, so as to store the page numbers. Then, in the advertisement print judging process, it may be judged whether the advertisement can be printed based on the aforementioned stored information. It is noted that the user may specify the page numbers of the pages on which the advertisement is to be printed by inputting a range of pages (specifically, a start page number and an end page number), or by inputting page numbers of the pages on which the user does not wish to print the advertisement. Thereby, the user can specify the pages on which the advertisement is to be printed more flexibly.

(6) According to the contents-providing system 1 in the aforementioned illustrative aspects, the printing device 10 is applied as a contents-outputting device. However, the contents-outputting device may be another outputting device such as a display device. For example, according to a contents-providing system configured with a display device as an alternative contents-outputting device of the printing device 10, the provider of the advertisement can grasp how much the second information has been displayed, and presume effects caused by displaying of the second information by aggregating displaying information as alternative information of the printing information, such as an area of the second information displayed on a screen of the display device, a data size of the second information, a number of times that the second information has been displayed, a position of the second information displayed on the screen of the display device, and a time period during which the second information has been displayed.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A printing device, comprising:
    a receiving portion configured to receive contents data comprising print data, advertising information, and an advertiser ID, the advertisement information being associated with the advertiser ID, from an external apparatus;
    a printing portion configured to print, on a printing medium, the print data and the advertisement information included in the contents data received by the receiving portion;
    an obtaining portion configured to obtain printing information related to amount of printing of the advertisement information, the printing information being associated with the advertiser ID;
    an aggregating portion configured to generate aggregated amount of the printing of the advertisement information for the advertiser ID by summing the amount of the printing of the advertisement information;
    a storing portion configured to store the aggregated amount of the printing of the advertisement information in association with the advertiser ID; and
    a sending portion configured to send the aggregated amount of the printing of the advertisement information and the associated advertiser ID stored by the storing portion to an aggregating server, and to send the aggregated amount of the printing of the advertisement information to an advertisement server to which the advertiser ID is assigned.

2. The printing device according to claim 1, further comprising a printing instruction inputting portion through which a printing instruction representing whether to make the printing portion print the print data and the advertisement information is inputted,
    wherein the printing portion is configured to operate based on the printing instruction inputted through the printing instruction inputting portion.

3. The printing device according to claim 2,
    wherein the printing instruction inputting portion is configured such that information on page numbers can be inputted therethrough, and
    wherein the printing portion is configured to operate based on the information on page numbers inputted through the printing instruction inputting portion.

4. The printing device according to claim 1, further comprising a category inputting portion through which a category of the print data and the advertisement information to be printed by the printing portion is inputted,
    wherein the printing portion is configured to print the print data and the advertisement information corresponding to the category inputted through the category inputting portion.

5. The printing device according to claim 1,
    wherein the printing information obtained by the obtaining portion includes information about at least one of an area of the print data and the advertisement information printed on the printing medium, a data size of the print data and the advertisement information, a number of times that the print data and the advertisement information has been printed, a position of the second information print data and the advertisement information printed on the printing medium, a type of the printing medium on which the print data and the advertisement information has been printed, an amount of image-forming material used for, printing the print data and the advertisement information, and a time period taken for printing the print data and the advertisement information.

6. A contents-providing system, comprising an application server, a printing device, an aggregating server and an advertiser server, an advertiser ID being assigned to the advertiser server,
    wherein the application server comprises:
        a first interface;
        a first storage storing contents data, the contents data comprising print data, advertisement information and the advertiser ID, the advertisement information being associated with the advertiser ID; and
        a first controller configured to transmit the contents data stored in the first storage to the printing device via the first interface;
    wherein the printing device comprises:
        a second interface;
        a second storage;
        a printer portion; and
        a second controller configured to:

receive the contents data, via the second interface, transmitted from the application server;

control the printer portion to print, on a printing medium, the print data and the advertisement information included in the received contents data;

obtain printing information related to amount of printing of the advertisement information, the printing information being associated with the advertiser ID;

generate aggregated amount of the printing of the advertisement information for the advertiser ID by summing the amount of the printing of the advertisement information;

store, in the second storage, the aggregated amount of the printing of the advertisement information in association with the advertiser ID;

transmit, via the second interface, the aggregated amount of the printing of the advertisement information and the associated advertiser ID stored in the second storage to the aggregating server; and transmit, via the second interface, the aggregated amount of the printing of the advertisement information stored in the second storage to the advertisement server, to which the advertiser ID is assigned, and wherein the aggregating server comprises:
a third interface;
a third storage; and
a third controller configured to:
receive, via the third interface, the aggregated amount of the printing of the advertisement information and the associated advertiser ID transmitted from the printing device;
determine a first consumable supply point in accordance with the received aggregated amount of the printing of the advertisement information;
store, in the third storage, the first consumable point in association with the advertiser ID;
determine whether a present time is a predetermined aggregating time;
determine a particular destination in accordance with the advertiser ID stored in the third storage; and
transmit, when the present time is the predetermined aggregating time, the consumable supply point aggregated amount of the printing of the advertisement information to the particular destination, via the third interface;

wherein the advertiser server comprises:
a fourth interface;
a fourth storage; and
a fourth controller configured to:
receive, via the fourth interface, the first consumable supply point transmitted from the aggregating server;
store the first consumable supply point in the fourth storage;
receive, via the fourth interface, the aggregated amount of the printing of the advertisement information and the associated advertiser ID from the printing device;
determine a second consumable supply point in accordance with the received aggregated amount of the advertisement information; and
store the second consumable supply point in the fourth storage.

7. The contents-providing system according to claim 6, wherein the third controller is further configured to send the printing information corresponding to an advertiser associated with the advertiser ID stored in third storage to an advertiser server of the specified advertiser ID.

8. The contents-providing system according to claim 6, wherein the second controller is further configured to send the printing information corresponding to an advertiser associated with the advertising ID stored in the second storage to an advertiser server of the specified advertiser ID.

9. The contents-providing system according to claim 6, wherein a condition ID used for judging whether the printing information and the advertisement information received by the aggregating server are valid is included in specified data of the contents data sent by the first controller of the application server, wherein the first controller is further configured to send the advertiser ID to the aggregating server in response to a predetermined condition being satisfied, wherein the second controller is configured to send the advertiser ID together with the printing information and the advertisement information to the aggregating server in response to the contents data received by the second controller including the advertiser ID, and wherein the third controller is configured to aggregate the printing information and the advertisement information sent from the printing device as valid information in response to the advertiser ID sent from the printing device and received by the third controller being identical to the advertiser ID sent from the application server and received by the third controller.

10. The contents-providing system according to claim 9, wherein the first controller is further configured to send the advertiser ID to a provider server of a provider specified by the advertiser ID included in the contents data sent from the first controller in response to a predetermined condition being satisfied, and wherein the second controller is further configured to send the printing information and the advertiser ID to a provider server of a provider specified by the advertiser ID included in the contents data received by the second controller in response to the contents data including the advertiser ID.

11. A non-transitory computer readable medium comprising computer readable instructions stored therein that cause a computer to execute steps of:

receiving contents data comprising print data, advertising information, and an advertiser ID, the advertisement information being associated with the advertiser ID from an application server;

performing printing of the print data and the advertisement information included in the contents data received in the step of receiving;

obtaining printing information related to amount of printing of the advertisement information, the printing information being associated with the advertiser ID;

generating aggregated amount of the printing of the advertisement information for the advertiser ID by summing the amount of the printing of the advertisement information;

storing the aggregated amount of the printing of the advertisement information in association with the advertiser ID; and sending the aggregated amount of the printing of the advertisement information and the associated advertiser ID stored in the step of storing to an aggregating server, and send the aggregated amount of the printing of the advertisement information to an advertisement server to which the advertiser ID is assigned.

* * * * *